(12) United States Patent
Tsukagoshi

(10) Patent No.: US 11,039,182 B2
(45) Date of Patent: Jun. 15, 2021

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/555,575

(22) PCT Filed: Apr. 1, 2016

(86) PCT No.: PCT/JP2016/060978
§ 371 (c)(1),
(2) Date: Sep. 5, 2017

(87) PCT Pub. No.: WO2016/163325
PCT Pub. Date: Oct. 13, 2016

(65) Prior Publication Data
US 2018/0054634 A1   Feb. 22, 2018

(30) Foreign Application Priority Data

Apr. 7, 2015 (JP) .............................. JP2015-078807

(51) Int. Cl.
*H04N 21/236* (2011.01)
*H04N 21/436* (2011.01)
(Continued)

(52) U.S. Cl.
CPC ......... *H04N 21/236* (2013.01); *H04N 21/233* (2013.01); *H04N 21/242* (2013.01); *H04N 21/436* (2013.01); *H04N 21/43635* (2013.01)

(58) Field of Classification Search
CPC ............ H04N 21/234; H04N 21/2343; H04N 21/8547; H04N 21/814; H04N 21/23614;
(Continued)

(56) References Cited

U.S. PATENT DOCUMENTS

2005/0058207 A1* 3/2005 Magee ................. H04N 7/52
375/240.26
2006/0181979 A1* 8/2006 Fukuda ................. G11B 20/10
369/47.1
(Continued)

FOREIGN PATENT DOCUMENTS

| JP | 2011-0103311 | * 5/2010 | ............. H04N 13/00 |
| JP | 2012-10311 A | 1/2012 | |
| JP | 2013-517699 A | 5/2013 | |

OTHER PUBLICATIONS

NPL 2_ Digital Hoso ni Okeru MMT ni yoru MediaTransport Hoshiki ARIB STD-B60, 1.0 edition. Association of Radio Industries and Businesses, p. 34, 31, Jul. 2014 (Year: 2014).*

(Continued)

*Primary Examiner* — Kunal Langhnoja
(74) *Attorney, Agent, or Firm* — Oblon, McClelland, Maier & Neustadt, L.L.P.

(57) ABSTRACT

When predetermined information divided into a predetermined number of audio frames is transmitted, the receiving end is enabled to readily and appropriately obtain the predetermined information.

An encoding process is performed on audio data, and a compressed audio data stream formed with successive audio frames including compressed audio data is generated. Predetermined information is inserted into the compressed audio data stream, and is then transmitted. The predetermined information is divided and inserted into a predetermined number of audio frames of the compressed audio data stream, and the first information indicating whether the current piece is the first piece of the divided information and the second information as a count number indicating the dividing position in descending order are added to each piece of the divided information.

13 Claims, 19 Drawing Sheets

(51) Int. Cl.
*H04N 21/233* (2011.01)
*H04N 21/242* (2011.01)
*H04N 21/4363* (2011.01)

(58) Field of Classification Search
CPC ........... H04N 21/4305; H04N 21/2146; H04N 21/236; H04N 21/436; H04N 21/233; H04N 21/242; H04N 21/43635; H04N 21/2335; H04N 21/4348; H04N 21/4394
USPC ..... 725/32, 33, 116, 109, 25, 134, 120, 131; 375/240.26
See application file for complete search history.

(56) References Cited

U.S. PATENT DOCUMENTS

| | | | | |
|---|---|---|---|---|
| 2007/0092224 | A1* | 4/2007 | Tsukagoshi | H04N 21/4341 386/202 |
| 2009/0219282 | A1* | 9/2009 | Kim | H04N 19/597 345/419 |
| 2011/0292173 | A1* | 12/2011 | Tsukagoshi | H04N 7/24 348/43 |
| 2016/0360269 | A1* | 12/2016 | An | H04N 21/462 |
| 2017/0070701 | A1* | 3/2017 | Nakajima | H04N 21/436 |

OTHER PUBLICATIONS

NPL1_English translation (Year: 2010).*
"MMT-Based Media Transport Scheme in Digital Broadcasting Systems," ARIB Standard B60, 1$^{st}$ edition, Association of Radio Industries and Business, Jul. 31, 2014, (p. 34 with English translation) (4 pages).
International Search Report dated Jun. 21, 2016 in PCT/JP2016/060978 filed Apr. 1, 2016.

* cited by examiner

FIG. 4

| usacExtElementType | Value |
|---|---|
| ID_EXT_ELE_FILL | 0 |
| ID_EXT_ELE_MPEGS | 1 |
| ID_EXT_ELE_SAOC | 2 |
| ID_EXT_ELE_AUDIOPREROLL | 3 |
| ID_EXT_ELE_UNI_DRC | 4 |
| ID_EXT_ELE_OBJ_METADATA | 5 |
| ID_EXT_ELE_SAOC_3D | 6 |
| ID_EXT_ELE_HOA | 7 |
| /* reserved for ISO use */ | 8-127 |
| /* reserved for use outside of ISO scope */ | 128 and higher |
| ID_EXT_ELE_universal_metadata | 128 |

FIG. 5 universal_metadata_frame syntax

| Syntax | No. of Bits | Format |
|---|---|---|
| universal_metadata_frame(){ | | |
| sync_byte | 8 | bslbf |
| metadata_type | 8 | uimsbf |
| start_flag | 1 | bslbf |
| dcounter | 7 | uimsbf |
| dt_id | 6 | uimsbf |
| timing_control_flag | 1 | bslbf |
| reserved | 1 | '1' |
| length | 8 | uimsbf |
| if (timing_control_flag ){ | | |
| time_information() | | |
| } | | |
| for ( I = 0; I < length ; i++ ){ | | |
| data_byte | 8 | bslbf |
| } | | |
| } | | |

FIG. 6

| Syntax | No. of Bits | Type |
|---|---|---|
| time_information(){ | | |
| absolute_time_flag | 1 | bslbf |
| reserved | 7 | 0x7f |
| if (absolute_time_flag ) { | | |
| exec_time_msw | 32 | uimsbf |
| exec_time_lsw | 32 | uimsbf |
| } else { | | |
| reference_UTC_msw | 32 | uimsbf |
| reference_UTC_lsw | 32 | uimsbf |
| offset_exec_time_msw | 32 | uimsbf |
| offset_exec_time_lsw | 32 | uimsbf |
| } | | |
| } | | |

FIG. 7

| Field | Value | Description |
|---|---|---|
| sync_code (8bits) | 'xx' | |
| metadata_type (8bits) | | INDICATING TYPE OF CONTAINER TARGET DATA<br>'0x10' CONTAINER TARGET DATA IS NET ACCESS INFORMATION<br>'0x11' CONTAINER TARGET DATA IS MEDIA FILE |
| start_flag (1bit) | | INDICATING START OF CONTAINER TARGET DATA |
| dcounter (7bits) | | INDICATING DIVIDING POSITION OF DIVIDED CONTAINER TARGET DATA WITH COUNT NUMBER IN DESCENDING ORDER "0" INDICATES LAST PIECE OF DIVIDED DATA, OR INDICATES THAT THERE IS NO DIVISION. |
| dt_id (6bits) | | INDICATING ID OF DATA.<br>ASSOCIATION CAN BE MADE BY REFERRING TO ID OF DATA WITH APPLICATION. |
| timing_control_flag (1bit) | | INDICATING WHETHER TIME SYNCHRONIZATION MANAGEMENT INFORMATION IS INSERTED |
| length (8bits) | | INDICATING DATA SIZE WITH ByteCount VALUE |
| absolute_time_flag (1bit) | | INDICATING WHETHER EXECUTION TIME IS UTC ABSOLUTE TIME OR IS VALUE OF DIFFERENCE FROM REFERENCE TIME<br>'1' INDICATING THAT EXECUTION TIME IS UTC ABSOLUTE TIME<br>'0' INDICATING THAT EXECUTION TIME IS VALUE OF DIFFERENCE FROM REFERENCE TIME |
| exec_time (64bits) | | INDICATING UTC ABSOLUTE TIME AS DATA EXECUTION TIME |
| reference_UTC (64bits) | | INDICATING REFERENCE TIME |
| offset_exec_time (64bits) | | INDICATING VALUE OF DIFFERENCE FROM REFERENCE TIME AS DATA EXECUTION TIME |

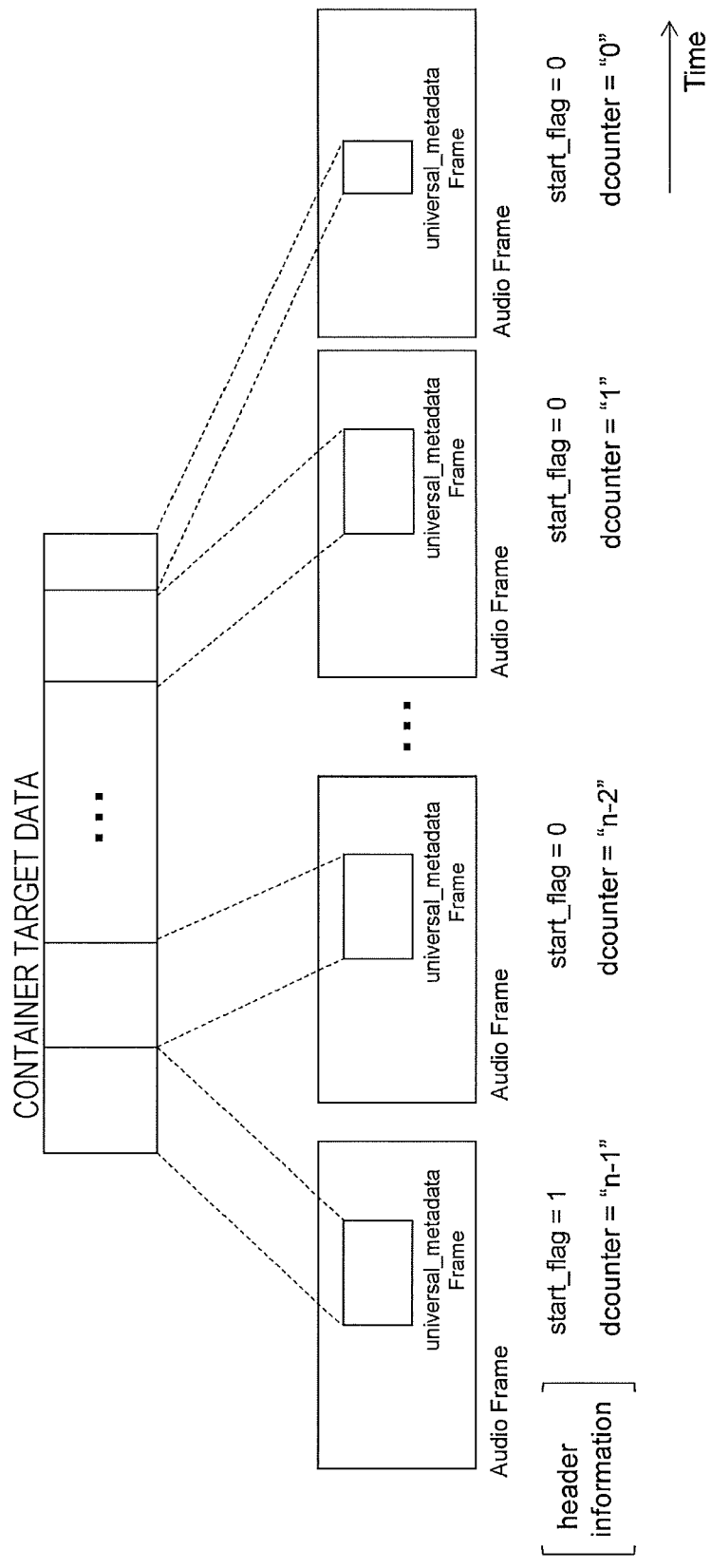

(2) WHERE CONTAINER TARGET DATA (PREDETERMINED INFORMATION) IS TRANSMITTED WITH ONE universal_metadata frame CONTAINER TARGET DATA

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method, and more particularly, to a transmission device and the like that insert predetermined information into a compressed audio data stream and transmits the compressed audio data stream.

BACKGROUND ART

By a technique disclosed in Patent Document 1, for example, predetermined information inserted in a compressed audio data stream is transmitted from a broadcasting station, a distribution server, or the like, a set-top box on the receiving side transmits the compressed audio data stream as it is to a television receiver via an HDMI digital interface, and the television receiver performs information processing using the predetermined information.

CITATION LIST

Patent Document

Patent Document 1: Japanese Patent Application Laid-Open No. 2012-010311

SUMMARY OF THE INVENTION

Problems to be Solved by the Invention

An object of the present technology is to enable the receiving side to readily and appropriately obtain predetermined information when the predetermined information is divided into a predetermined number of audio frames and is transmitted.

Solutions to Problems

A concept of the present technology lies in a transmission device that includes:

a stream generation unit that performs an encoding process on audio data, and generates a compressed audio data stream formed with successive audio frames including compressed audio data;

an information insertion unit that inserts predetermined information into the compressed audio data stream; and a stream transmission unit that transmits the compressed audio data stream in which the predetermined information is inserted, in which the information insertion unit divides and inserts the predetermined information into a predetermined number of audio frames of the compressed audio data stream, and adds first information and second information to each piece of the divided predetermined information, the first information indicating whether the current piece is the first piece of the divided predetermined information, the second information being a count number indicating a dividing position in descending order.

In the present technology, the stream generation unit performs an encoding process on audio data, and generates a compressed audio data stream formed with successive audio frames including compressed audio data. The information insertion unit inserts predetermined information into the compressed audio data stream. The predetermined information may be network access information or a media file, for example.

Here, when the predetermined information is divided and inserted into a predetermined number of audio frames of the compressed audio data stream, the first information indicating whether the current piece is the first piece of the divided information and the second information as a count number indicating the dividing position in descending order are added to each piece of the divided information.

As described above, in the present technology, the predetermined information is divided and inserted, and the first information indicating whether the current piece is the first piece of the divided information and the second information as a count number indicating the dividing position in descending order are added to each piece of the divided information. Accordingly, it is possible for the receiving side to recognize the first piece of the divided information from the first information, recognize the number of divisions from the second information corresponding to the first piece of the divided information, and further recognize the number of the remaining pieces of the divided information from the second information. Thus, the receiving side can readily and appropriately obtain the predetermined information.

It should be noted that, in the present technology, when inserting the predetermined information into the compressed audio data stream, the information insertion unit may add UTC-based time information for managing time synchronization to the predetermined information, for example. In this case, the time information may be an absolute time or the value of a difference from a predetermined reference time. With such UTC-based time information, it is possible to achieve affinity with a general-purpose system.

Another concept of the present technology lines in a reception device that includes:

a stream reception unit that receives a compressed audio data stream from an external device via a digital interface, predetermined information being inserted in the compressed audio data stream, respective pieces of divided information obtained by dividing the predetermined information being inserted in a predetermined number of audio frames of the compressed audio data stream, first information and second information being added to each piece of the divided information, the first information indicating whether a current piece is the first piece of the divided information, the second information being a count number indicating a dividing position in descending order;

a decoding processing unit that obtains audio data by performing a decoding process on the compressed audio data stream, and, in accordance with the first information and the second information, obtains the respective pieces of the divided information forming the predetermined information from the predetermined number of audio frames; and an information processing unit that performs information processing using the predetermined information obtained by the decoding processing unit.

In the present technology, the reception unit receives a compressed audio data stream having predetermined information inserted therein from an external device via a digital interface compliant with High-Definition Multimedia Interface (HDMI), for example. Here, respective pieces of divided information obtained by dividing the predetermined information are inserted into the predetermined number of audio frames of the compressed audio data stream, and the first information indicating whether the current piece is the first piece of the divided information and the second information as a count number indicating the dividing position in descending order are added to each piece of the divided information.

The decoding processing unit obtains audio data by performing a decoding process on the compressed audio data stream, and also obtains the respective pieces of the divided information forming the predetermined information from the predetermined number of audio frames in accordance with the first information and the second information. The information processing unit then performs information processing using the predetermined information obtained by the decoding processing unit.

The predetermined information may be network access information, for example, and the information processing unit may obtain predetermined media information by accessing a predetermined server in a network, using the network access information. Alternatively, the predetermined information may be a media file, for example, and the information processing unit may perform a reproduction process on the media file.

As described above, in the present technology, the process of obtaining each piece of the divided information forming the predetermined information from a predetermined number of audio frames is performed in accordance with the first information and the second information. In this case, it is possible to recognize the first piece of the divided information from the first information, recognize the number of divisions from the second information corresponding to the first piece of the divided information, and further recognize the number of the remaining pieces of the divided information from the second information. Thus, the predetermined information can be readily and appropriately obtained.

It should be noted that, in the present technology, UTC-based time information for managing time synchronization may be added to the predetermined information, and the information processing unit may perform time management on the information processing using the predetermined information, in accordance with the UTC-based time information added to the predetermined information.

Effects of the Invention

According to the present technology, when predetermined information divided into a predetermined number of audio frames is transmitted, the receiving end can readily and appropriately obtain the predetermined information. It should be noted that the advantageous effects described in this specification are merely examples, and the advantageous effects of the present technology are not limited to them and may include additional effects.

BRIEF DESCRIPTION OF DRAWINGS

FIG. 4 is a table showing a correspondence relationship between types of extension elements and their values.

FIG. 5 is a table showing an example configuration of a universal metadata frame including universal metadata as an extension element.

FIG. 6 is a table showing an example configuration of the field of "time_information ( )" in the universal metadata frame.

FIG. 7 is a table showing the contents of the principal information in the example configuration of the field of "time_information ( )" in the universal metadata frame.

FIG. 8 is a diagram showing an example case where container target data is transmitted with universal metadata frames.

MODES FOR CARRYING OUT THE INVENTION

Figure 1:
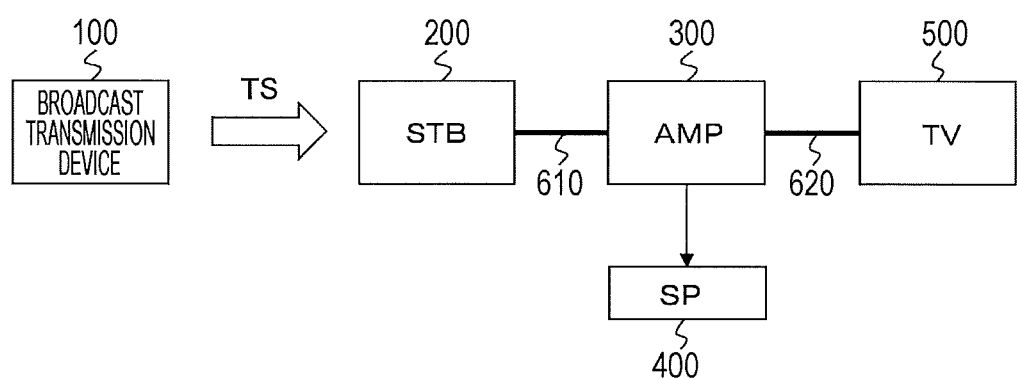
FIG. 1 is a block diagram showing an example configuration of a transmission/reception system as an embodiment.

The following is a description of a mode for carrying out the invention (the mode will be hereinafter referred to as the "embodiment"). Explanation will be made in the following order.
1. Embodiment
2. Modifications 1. Embodiment Example Configuration of a Transmission/Reception System FIG. 1 shows an example configuration of a transmission/reception system 10 as an embodiment. The transmission/reception system 10 includes a broadcast transmission device 100, a set-top box (STB) 200, an audio amplifier (AMP) 300, and a television receiver (TV) 500. A multichannel speaker system 400 is connected to the audio amplifier 300.

The set-top box 200 and the audio amplifier 300 are connected to each other via an HDMI cable 610. In this case, the set-top box 200 is the source, and the audio amplifier 300 is the destination. The audio amplifier 300 and the television receiver 500 are also connected to each other via an HDMI cable 620. In this case, the audio amplifier 300 is the source, and the television receiver 500 is the destination. It should be noted that "HDMI" is a registered trademark.

The broadcast transmission device 100 transmits a transport stream TS on broadcast waves. The transport stream TS includes a video stream and an audio stream (a compressed audio data stream). The broadcast transmission device 100 inserts predetermined information, such as network access information or a media file, as container target data into the audio stream.

The network access information includes information on a URL for connecting to a link server, and a control code group for controlling the link server such as "Activate" or "Inactivate", for example. The media file includes a general data file of character data and the like, an audio data file, and an audio/visual data file, for example.

The broadcast transmission device 100 divides and inserts the predetermined information into a predetermined number of audio frames of the audio stream. At this point, the broadcast transmission device 100 adds first information indicating whether the current piece is the first piece of the divided information and second information as a count number indicating a dividing position in descending order to each piece of the divided information. It should be noted that the predetermined number may be "1". When the predetermined number is 1, the predetermined information is not actually divided, but the entire information is inserted into one audio frame.

Further, when inserting the predetermined information into the audio stream, the broadcast transmission device 100 adds time information based on Coordinated Universal Time (UTC) for managing time synchronization to the predetermined information. For example, the time information is an absolute time or the value of a difference from a predetermined reference time.

The set-top box 200 receives the transport stream TS transmitted on broadcast waves from the broadcast transmission device 100. As described above, the transport stream TS includes a video stream and an audio stream, and the predetermined information is inserted in the audio stream.

The set-top box 200 transmits the received audio stream, as well as uncompressed video data obtained by performing a decoding process on the video stream, to the audio amplifier 300 via the HDMI cable 610. As a result, the predetermined information inserted in the audio stream is also sent to the audio amplifier 300.

The audio amplifier 300 receives the audio stream in which the predetermined information is inserted, as well as the uncompressed video data, from the set-top box 200 via the HDMI cable 610. The audio amplifier 300 obtains multichannel audio data by performing a decoding process on the audio stream, and supplies the audio data to the speaker system 400.

The audio amplifier 300 also transmits the received uncompressed video data and audio stream to the television receiver 500 via the HDMI cable 620. As a result, the predetermined information inserted in the audio stream is also sent to the television receiver 500.

The television receiver 500 receives the audio stream in which the predetermined information is inserted, as well as the uncompressed video data, from the audio amplifier 300 via the HDMI cable 620. The television receiver 500 displays an image based on the uncompressed video data. The television receiver 500 also performs a decoding process on the audio stream, and obtains the predetermined information.

The predetermined information is divided and inserted into a predetermined number of audio frames of the audio stream, and the first information indicating whether the current piece is the first piece of the divided information and the second information as a count number indicating the dividing position in descending order are added to each piece of the divided information. In accordance with the first information and the second information, the television receiver 500 obtains each piece of the divided information forming the predetermined information, from the predetermined number of audio frames.

In this case, the television receiver 500 can recognize the first piece of the divided information from the first information, recognize the number of divisions from the second information corresponding to the first piece of the divided information, and further recognize the number of the remaining pieces of the divided information from the second information. Thus, the television receiver 500 can easily and appropriately obtain each piece of the divided information forming the predetermined information from the predetermined number of audio frames.

The television receiver 500 performs information processing using the predetermined information. When the predetermined information is network access information, for example, the television receiver 500 accesses a predetermined server in the network, and obtains predetermined media information. Further, when the predetermined information is a media file, for example, the television receiver 500 performs a reproduction process on the media file.

UTC-based time information for managing time synchronization is added to the predetermined information. The television receiver 500 performs time management on information processing using predetermined information in accordance with the added time information.

Stream Generation Unit of the Broadcast Transmission Device

Figure 2:
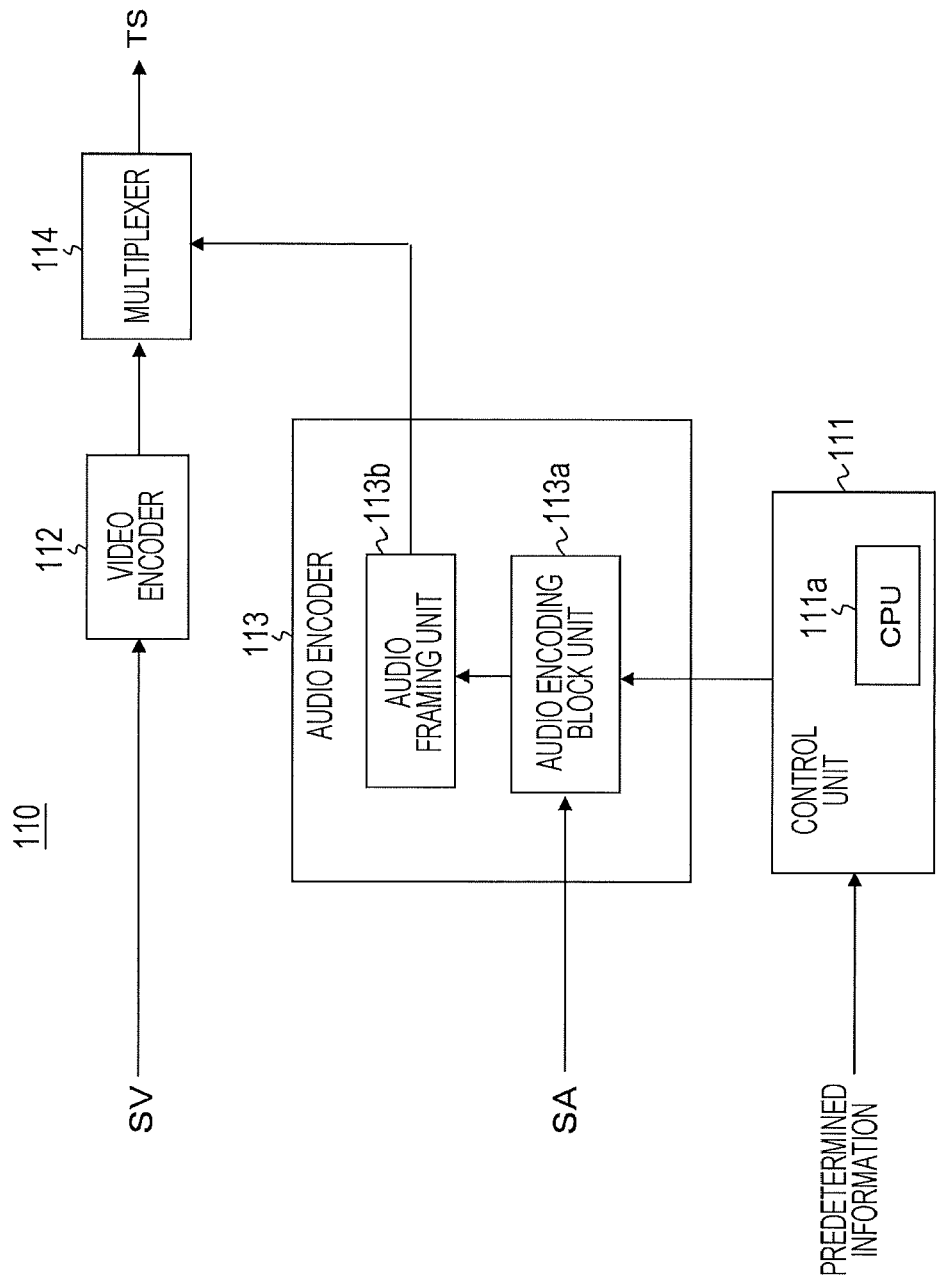
FIG. 2 is a block diagram showing an example configuration of a stream generation unit included in a broadcast transmission device.

FIG. 2 shows an example configuration of a stream generation unit 110 in the broadcast transmission device 100. The stream generation unit 110 includes a control unit 111, a video encoder 112, an audio encoder 113, and a multiplexer 114.

The control unit 111 includes a CPU 111*a*, and controls the respective components of the stream generation unit 110. The video encoder 112 performs encoding, such as MPEG2, H.264/AVC, or H.265/HEVC, on video data (image data) SV, to generate a video stream (a video elementary stream). The video data SV is video data reproduced from a recording medium such as an HDD, or live video data obtained with a video camera, for example.

The audio encoder 113 performs encoding on audio data (sound data) SA in conformity with the compression format of MPEG-H 3D Audio, to generate an audio stream (an audio elementary stream). The audio data SA corresponds to the above described video data SV. The audio data SA is audio data reproduced from a recording medium such as an HDD, live audio data obtained with a microphone, or the like.

The audio encoder 113 includes an audio encoding block unit 113*a* and an audio framing unit 113*b*. A coded block is generated at the audio encoding block unit 113*a*, and framing is performed at the audio framing unit 113*b*.

Under the control of the control unit 111, the audio encoder 113 inserts the predetermined information into the audio stream. In this embodiment, the predetermined information is network access information or a media file, for example.

The audio encoder 113 divides and inserts the predetermined information into the predetermined number (which may be "1") of audio frames of the audio stream. At this point, the audio encoder 113 adds the first information indicating whether the current piece is the first piece of the divided information and the second information as a count number indicating a dividing position in descending order to each piece of the divided information. Also, at this point, the audio encoder 113 adds the UTC-based time information (time information indicating the execution time) for managing time synchronization, to the predetermined information.

Figure 3:
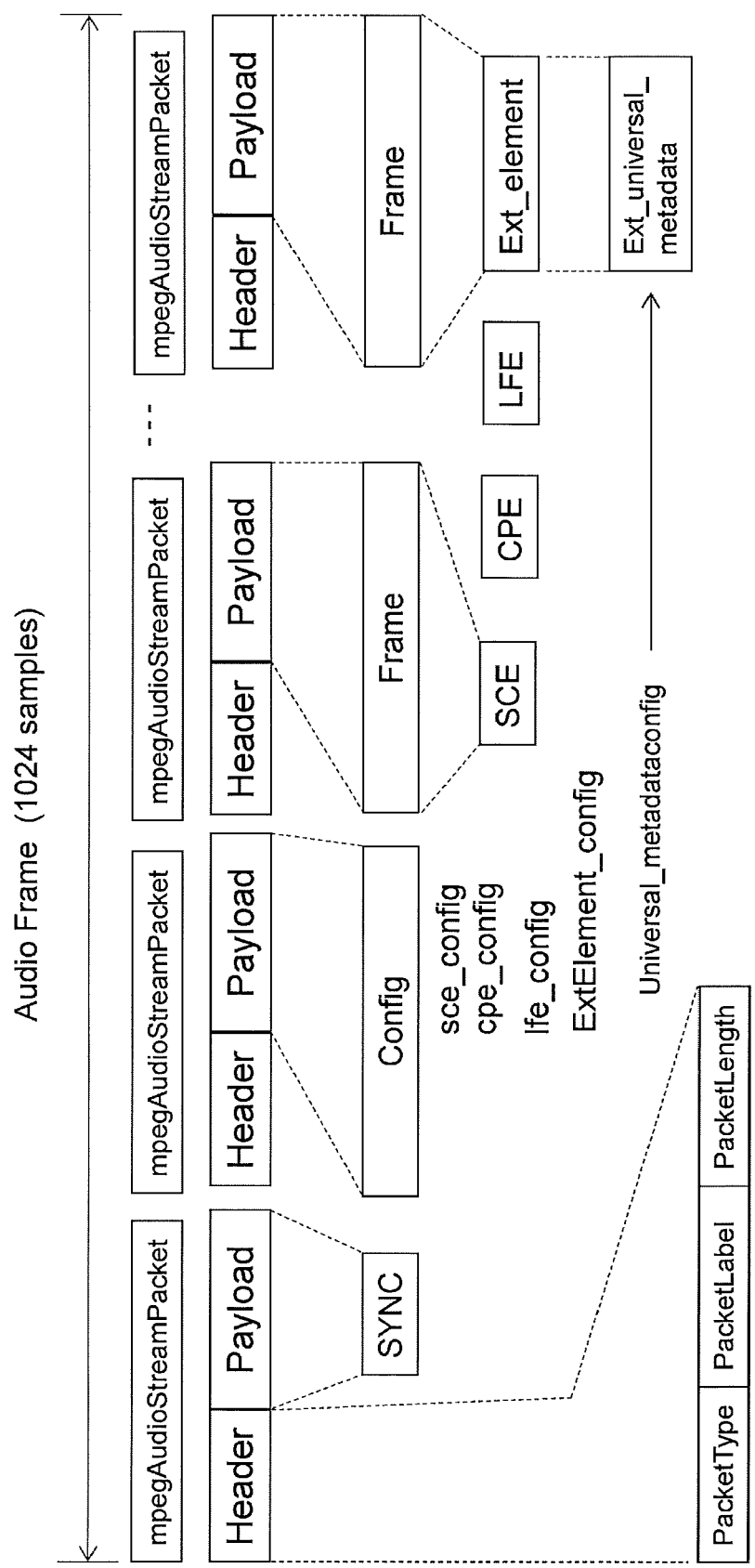
FIG. 3 is a diagram showing an example structure of an audio frame (1024 samples) in transmission data of MPEG-H 3D Audio.

FIG. 3 shows an example structure of an audio frame (1024 samples) in transmission data of MPEG-H 3D Audio. This audio frame is formed with MPEG audio stream packets (mpeg Audio Stream Packets). Each MPEG audio stream packet is formed with a header (Header) and a payload (Payload).

The header contains information such as a packet type (Packet Type), a packet label (Packet Label), and a packet length (Packet Length). The payload contains information defined by the packet type in the header. This payload information includes "SYNC" equivalent to a synchronization start code, "Frame" as the actual data of 3D audio transmission data, and "Config" indicating the configuration of this "Frame".

"Frame" includes channel coded data and object coded data constituting the 3D audio transmission data. Here, the channel coded data is formed with encoded sample data such as a single channel element (SCE), a channel pair element (CPE), and a low frequency element (LFE). Meanwhile, the object coded data is formed with encoded sample data of a single channel element (SCE) and metadata for rendering the coded sample data by mapping the coded sample data to a speaker located at any appropriate position. This metadata is included as an extension element (Ext_element).

In this embodiment, an element (Ext_userdata) having the predetermined information such as network access information or a media file as universal metadata (universal_metadata) is newly defined as an extension element (Ext_element). Along with this, the configuration information (universal_metadataConfig) about the element (Ext_universal_metadata) is newly defined in "Config".

FIG. 4 shows the correspondence relationship between the types (ExElementType) of extension elements (Ext_element) and their values (Value). At present, 0 through 7 are defined. Since it is possible to extend outside MPEG at 128 and later, 128 is newly defined as the value of the type "ID_EXT_ELE_universal_metadata", for example. In the case of standards such as MPEG, it is also possible to define the range from 8 to 127.

FIG. 5 shows an example configuration (syntax) of a universal metadata frame (universal_metadata_frame ( )) including universal metadata as an extension element. FIG. 6 shows an example configuration (syntax) of a field of "time_information ( )" in the universal metadata frame. FIG. 7 shows the contents (semantics) of the principal information in the respective example configurations.

The 8-bit field of "metadata_type" indicates the type of the container target data. For example, "0x10" indicates that the container target data is net access information, and "0x11" indicates that the container target data is a media file.

The 1-bit field of "start_flag" indicates whether the current information piece is the start of the container target data. Here, "1" indicates the start, while "0" does not indicate the start. The 7-bit field of "dcounter" indicates the dividing position of the divided metadata with a count number in descending order. Here, "0" indicates the last piece of the divided metadata. In a case where "start_flag" is "1" and "dcounter" is "0", the container target data is not divided.

The 6-bit field of "dt_id" indicates the ID of the data. The ID of the data is referred to with an application, and an association with the ID is made. The 1-bit field of "timing_control_flag" indicates whether synchronization management information is inserted. Here, "1" indicates that synchronization management information is inserted, and "0" indicates that synchronization management information is not inserted. The 8-bit field of "length" indicates the size of the subsequent data with a byte count value.

The container target data (network access information, a media file, or the like) is placed in the field of "data_byte". Also, when "timing_control_flag" is "1", there is the field of "time_information ( )".

The 1-bit field of "absolute_time_flag" indicates whether the execution time is an UTC absolute time or whether the execution time is the value of a difference from the reference time. Here, "1" indicates that the execution time is an UTC absolute time. Meanwhile, "0" indicates that the execution time is the value of a difference from the reference time.

When "absolute_time_flag" is "1", there are the 32-bit field of "exec_time_msw" and the 32-bit field of "exec_time_lsw". The field of "exec_time_msw" indicates the high 32 bits of the UTC absolute time, which is the data execution time, and the field of "exec_time_lsw" indicates the low 32 bits thereof.

When "absolute_time_flag" is "0", there are the 32-bit field of "reference_UTC_msw", the 32-bit field of "reference_UTC_lsw", the 32-bit field of "offset_exec_time_msw", and the 32-bit field of "offset_exec_time_lsw". The field of "reference_UTC_msw" indicates the high 32 bits of the reference time, and the field of "reference_UTC_lsw" indicates the low 32 bits of the reference time. The field of "offset_exec_time_msw" indicates the high 32 bits of the value of the difference from the reference time, which is the data execution time, and the field of "offset_exec_time_lsw" indicates the low 32 bits thereof.

Referring back to FIG. 2, the multiplexer 114 converts the video stream output from the video encoder 112 and the audio stream output from the audio encoder 113 into a PES packet, further converts and multiplexes the PES packet into a transport packet, and thus obtains the transport stream TS as a multiplexed stream.

Operation of the stream generation unit 110 shown in FIG. 2 is now briefly described. The video data SV is supplied to the video encoder 112. In the video encoder 112, encoding such as H.264/AVC or H.265/HEVC is performed on the video data SV, so that a video stream including encoded video data is generated.

Meanwhile, the audio data SA is supplied to the audio encoder 113. In the audio encoder 113, the audio data SA is encoded in conformity with the compression format of MPEG-H 3D Audio, so that an audio stream (a compressed audio data stream) is generated.

At this point, the predetermined information (network access information, a media file, or the like) to be inserted into the audio stream, or the container target data, is supplied from the control unit 111 to the audio encoder 113. In the audio encoder 113, the container target data (the predetermined information) is divided and inserted into a predetermined number (which may be "1") of audio frames of the audio stream. At this point, in the audio encoder 113, the first information indicating whether the current piece is the first piece of the divided information and the second information as a count number indicating the dividing position in descending order are added to each piece of the divided information. Also, in the audio encoder 113 at this point, the UTC-based time information (time information indicating the execution time) for managing time synchronization is added to the predetermined information.

The video stream generated by the video encoder 112 is supplied to the multiplexer 114. Meanwhile, the audio stream generated by the audio encoder 113 is supplied to the multiplexer 114. Then, in the multiplexer 114, the streams supplied from the respective encoders are packetized and multiplexed, and thus, the transport stream TS is obtained as transmission data.

Insertion of the Container Target Data
(Predetermined Information)

Insertion of the container target data into an audio stream is now described in greater detail. FIG. 8 shows an example case where the container target data is transmitted with universal metadata frames.

In this case, the container target data is divided into pieces. The respective pieces of the divided information are allocated to universal metadata frames, and are inserted into the fields of "data_byte" (see FIG. 5). Here, "start_flag" corresponding to the first piece of the divided information is set to "1", which indicates that it is the first piece of the divided information. Meanwhile, "dcounter" corresponding to the first piece of the divided information is set to "n−1", and "1" is added to the value of "dcounter", to indicate the number "n" of divisions.

Here, "start_flag" corresponding to the second and subsequent pieces of the divided information is set to "0", which indicates that it is not the first piece of the divided information. Meanwhile, "dcounter" corresponding to the second and subsequent pieces of the divided information is a count number that is sequentially decremented from "n−1", and indicates the dividing position as well as the number of remaining pieces of the divided information. Further, "dcounter" corresponding to the last piece of the divided information is set to "0", which indicates that it is the last piece of the divided information.

Alternatively, "dcounter" corresponding to the first piece of the divided information may be set to "n", "dcounter" corresponding to the second and subsequent pieces of the divided information may be a counter number that is sequentially decremented from "n", and "dcounter" corresponding to the last piece of the divided information may be set to "1". Here, "n" of "dcounter" corresponding to the first piece of the divided information indicates the number of divisions, and "dcounter" being "1" indicates the last piece of the divided information.

Figure 9:
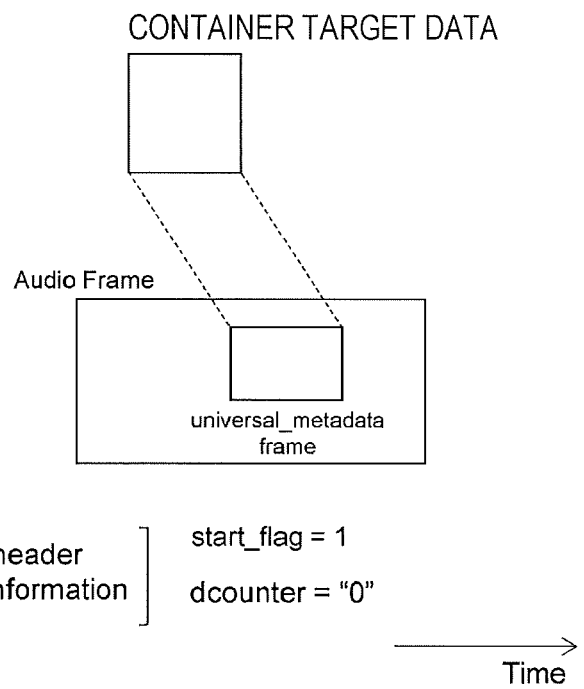
FIG. 9 is a diagram showing an example case where container target data is transmitted with one universal metadata frame.

FIG. 9 shows an example case where the container target data is transmitted with one universal metadata frame. In this case, the container target data is not divided but is inserted into the field of "data_byte" in one universal metadata frame (see FIG. 5). Here, "start_flag" is set to "1", which indicates that it is the first piece of the divided information. Meanwhile, "dcounter" is set to "0", which indicates that it is the last piece of the divided information. As can be seen from these pieces of information, the container target data is not divided.

Figure 10:
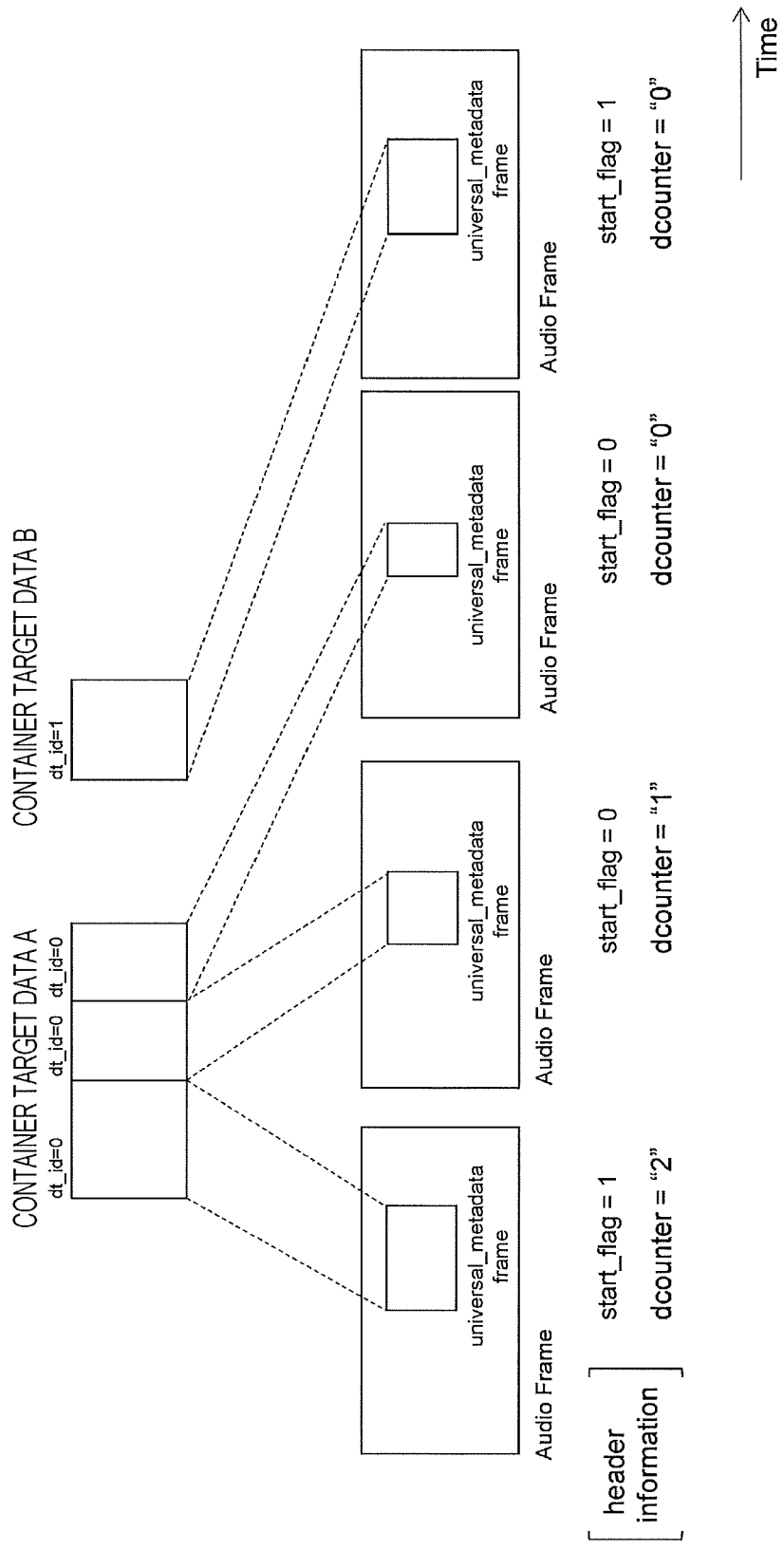
FIG. 10 is a diagram showing an example case where sets of container target data are transmitted with universal metadata frames.

FIG. 10 shows an example case where sets of container target data are transmitted with universal metadata frames. In the example shown in the drawing, two sets of container target data, which are container target data A having "0" as "dt_id" and container target data B having "1" as "dt_id", are transmitted.

In this case, the container target data A is divided into three pieces. The three pieces of the divided information are allocated to three universal metadata frames and are inserted into the fields of "data_byte" (see FIG. 5). Here, "start_flag" corresponding to the first piece of the divided information is set to "1", which indicates that it is the first piece of the divided information. Meanwhile, "dcounter" corresponding to the first piece of the divided information is set to "2", and "1" is added to the value of "dcounter", to indicate the number "3" of divisions.

Here, "start_flag" corresponding to the second piece of the divided information is set to "0", which indicates that it is not the first piece of the divided information. Meanwhile, "dcounter" corresponding to the second piece of the divided information is set to "1", to indicate the dividing position and that the number of the remaining pieces of the divided information is "1". Further, "start_flag" corresponding to the last piece of the divided information is set to "0", which indicates that it is not the last piece of the divided information. Meanwhile, "dcounter" corresponding to the last piece of the divided information is set to "0", which indicates that it is the last piece of the divided information.

Meanwhile, the container target data B is not divided but is inserted into the field of "data_byte" in one universal metadata frame (see FIG. 5). Here, "start_flag" is set to "1", which indicates that it is the first piece of the divided information. Meanwhile, "dcounter" is set to "0", which indicates that it is the last piece of the divided information.

As can be seen from these pieces of information, the container target data B is not divided.

Synchronization Management of the Container
Target Data (Predetermined Information)

Figure 11:
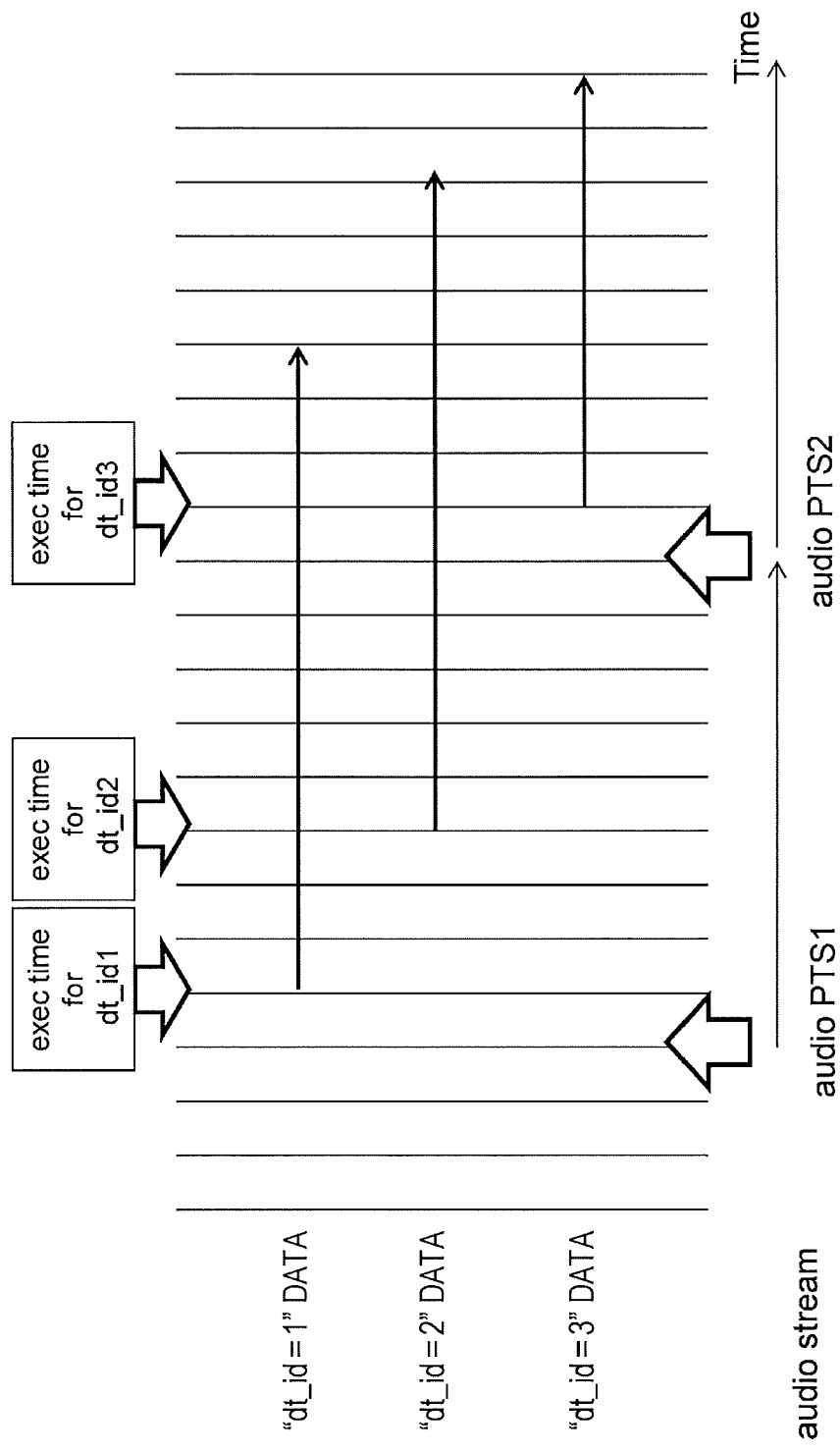
FIG. 11 is a diagram showing an example where execution of sets of container target data is managed independently of audio PTS, in accordance with time information added to sets of container target data.

Synchronization management of the container target data (the predetermined information) is now described. FIG. 11 shows an example where execution of sets of container target data is managed independently of the audio PTS, in accordance with the time information added to the sets of container target data.

In this example, execution of the container target data having "1" as "dt_id" is started at the corresponding execution time (exec_time), execution of the container target data having "2" as "dt_id" is started at the corresponding execution time, and further, execution of the container target data having "3" as "dt_id" is started at the corresponding execution time.

Figure 12:
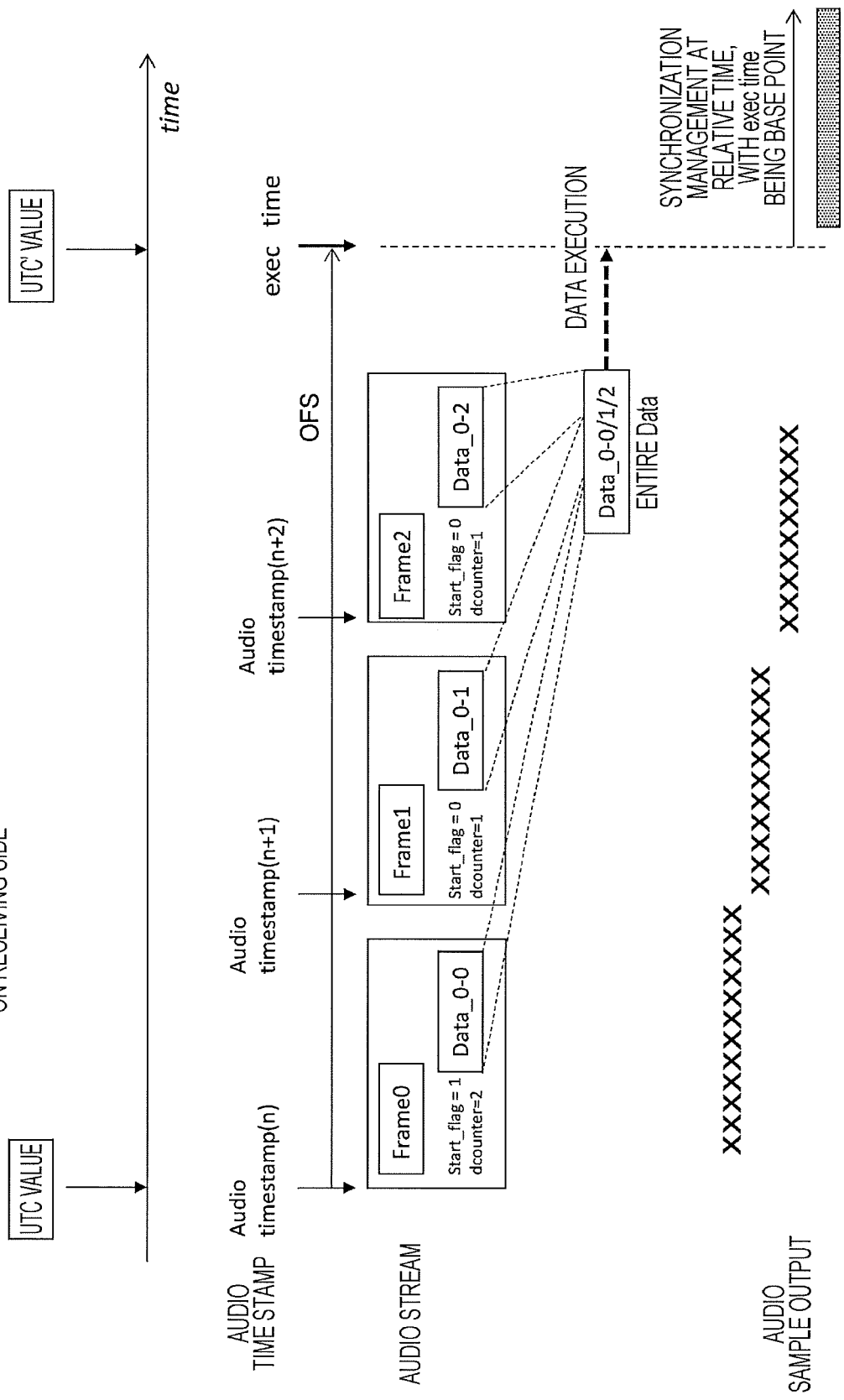
FIG. 12 is a diagram showing that execution of container target data (predetermined information) on the receiving side can be performed without dependence on any audio time stamp.

FIG. 12 shows that execution of the container target data (the predetermined information) on the receiving side can be performed without dependence on any audio time stamp. In this example, the container target data is divided into three pieces are allocated and inserted into three audio frames.

This example also shows a case where the execution time of the container target data is represented by the value of a difference OFS from the reference time, and this reference time is equal to "Audio timestamp (n)". This "Audio timestamp (n)" indicates the timing at which outputting of audio data (an audio sample) obtained by decoding an audio frame 0 (Frame 0) is started. This "Audio timestamp (n)" corresponds to "UTC value".

The container target data divided and inserted into three audio frames are transmitted, and execution of the container target data is started at the execution time (exec time), which is the time calculated by adding the difference value OFS to the reference time. That is, execution of the container target data is carried out without dependence on any audio time stamp.

Here, in a case where the container target data has a relative type stamp therein, synchronization management is carried out at a relative time based on the execution time. For example, in a case where the container target data is a media file such as an MP3 without the concept of time, reproduction is immediately started at the execution time. Further, in a case where the current container is a media file such as an MP4 having a relative time stamp, for example, reproduction synchronization management is carried out, with the execution time being the base point.

In the example shown in FIG. 12, the execution time of the container target data is represented by the value of a difference OFS from the reference time. However, a similar operation can be performed in a case where the execution time of this container target data is represented by an UTC absolute time "UTC' value", which indicates the execution time (exec time). That is, the time information indicating the execution time to be added to the container target data may be the UTC absolute time or the value of a difference from the reference time, as described above.

Figure 13:
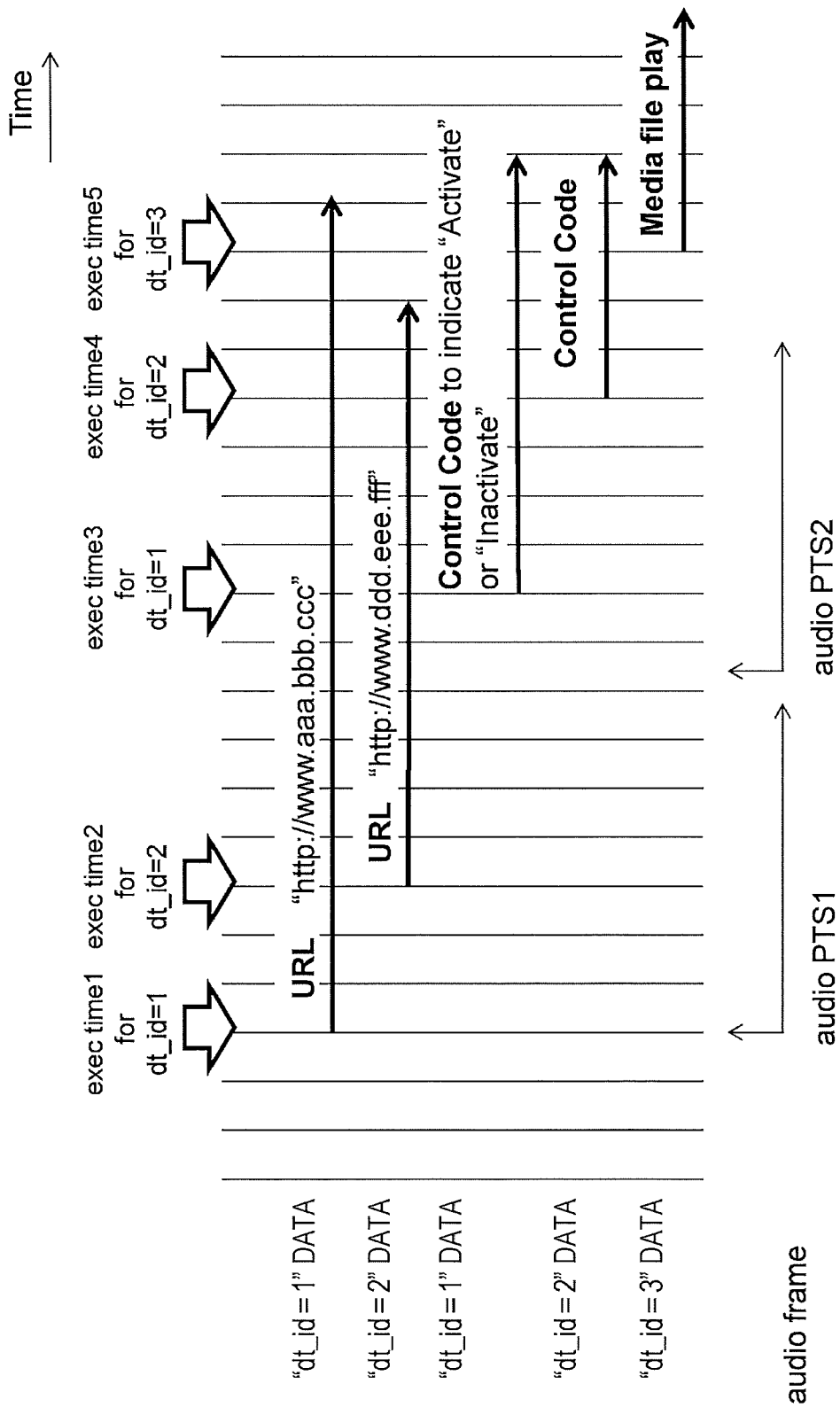
FIG. 13 is a diagram showing a specific example where sets of container target data are subjected to synchronization management in accordance with time information added thereto.

FIG. 13 shows a specific example where sets of container target data are subjected to synchronization management in accordance with the time information added thereto. In this example, information about the URL for connecting to a link server and a control code group for performing control such as "Activate" or "Inactivate" on the link server are transmitted as the container target data having "1" as "dt_id".

In this case, connecting to a link server is performed with the URL at the execution time "exec time 1". After that, from the execution time "exec time 3", control such as "Activate" or "Inactivate" is performed on the link server with the control code group, so that media reproduction is started and ended from the link server.

Further, in this example, information about the URL for connecting to a link server and a control code group for performing control such as "Activate" or "Inactivate" on the link server are also transmitted as the container target data having "2" as "dt_id".

In this case, connecting to a link server is performed with the URL at the execution time "exec time 2". After that, from the execution time "exec time 4", control such as "Activate" or "Inactivate" is performed on the link server with the control code group, so that media reproduction is started and ended from the link server.

Further, in this example, a media file is transmitted as the container target data having "3" as "dt_id". From the execution time "exec time 5", reproduction of the media file is started.

Example Configuration of the Set-Top Box

Figure 14:
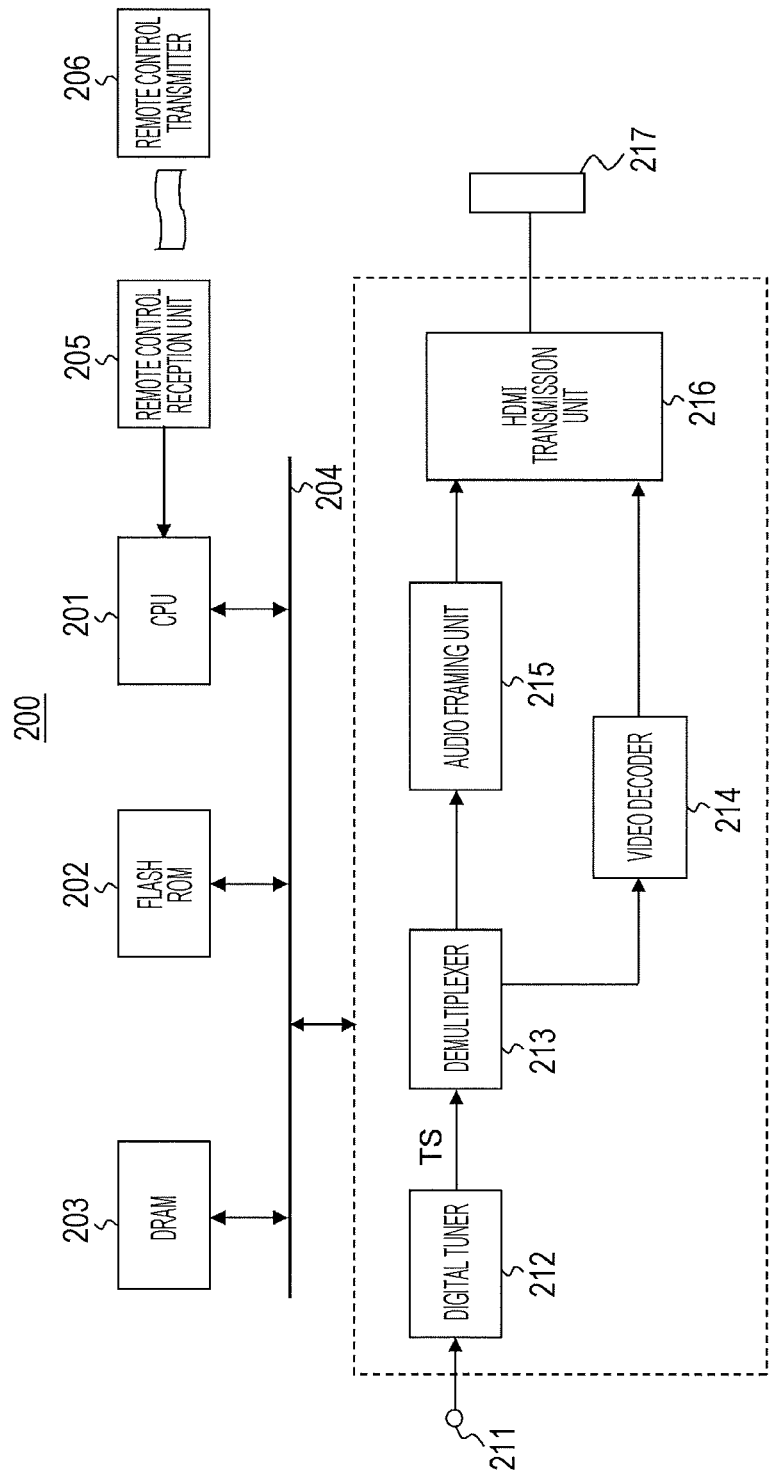
FIG. 14 is a block diagram showing an example configuration of a set-top box.

FIG. 14 shows an example configuration of the set-top box 200. The set-top box 200 includes a CPU 201, a flash ROM 202, a DRAM 203, an internal bus 204, a remote control reception unit 205, and a remote control transmitter 206. The set-top box 200 also includes an antenna terminal 211, a digital tuner 212, a demultiplexer 213, a video decoder 214, an audio framing unit 215, an HDMI transmission unit 216, and an HDMI terminal 217.

The CPU 201 controls operation of each component of the set-top box 200. The flash ROM 202 stores control software and data. The DRAM 203 forms a work area for the CPU 201. The CPU 201 loads software and data read from the flash ROM 202 into the DRAM 203, and activates the software, to control the respective components of the set-top box 200.

The remote control reception unit 205 receives a remote control signal (a remote control code) transmitted from the remote control transmitter 206, and supplies the remote control signal to the CPU 201. In accordance with this remote control code, the CPU 201 controls the respective components of the set-top box 200. The CPU 201, the flash ROM 202, and the DRAM 203 are connected to the internal bus 204.

The antenna terminal 211 is a terminal to which a television broadcast signal received by a reception antenna (now shown) is input. The digital tuner 212 processes the television broadcast signal input to the antenna terminal 211, and outputs the transport stream TS corresponding to the channel selected by the user.

The demultiplexer 213 extracts a video stream packet from the transport stream TS, and sends the packet to the video decoder 214. The video decoder 214 reconstructs the video stream from the video packet extracted by the demultiplexer 213, and performs a decoding process, to obtain uncompressed video data (image data).

The demultiplexer 213 also extracts an audio stream packet from the transport stream TS, and reconstructs the audio stream. The audio framing unit 215 performs framing on the audio stream reconstructed in this manner. In this audio stream, the predetermined information (the container target data) such as network access information or a media file is inserted as explained in the description of the stream generation unit 110 (see FIG. 2).

The HDMI transmission unit 216 transmits, from the HDMI terminal 217, the uncompressed video data obtained by the video decoder 214 and the audio stream subjected to the framing by the audio framing unit 215, by performing HDMI-compliant communication. To perform transmission through a TMDS channel compliant with HDMI, the HDMI transmission unit 216 packs the video data and the audio stream, and then outputs the video data and the audio stream to the HDMI terminal 217. The HDMI transmission unit 216 will be described later in detail.

Operation of the set-top box 200 is now briefly described. A television broadcast signal input to the antenna terminal 211 is supplied to the digital tuner 212. In the digital tuner 212, the television broadcast signal is processed, and the transport stream TS corresponding to the channel selected by the user is output.

The transport stream TS output from the digital tuner 212 is supplied to the demultiplexer 213. In the demultiplexer 213, a video elementary stream packet is extracted from the transport stream TS, and is sent to the video decoder 214.

In the video decoder 214, after the video stream is reconstructed from the video packet extracted by the demultiplexer 213, a decoding process is performed on the video stream, so that uncompressed video data is obtained. The uncompressed video data is supplied to the HDMI transmission unit 216.

In the demultiplexer 213, an audio stream packet is also extracted from the transport stream TS, and the audio stream having the predetermined information (the container target data) such as network access information or a media file inserted therein is reconstructed. This audio stream is subjected to framing by the audio framing unit 215, and is then supplied to the HDMI transmission unit 216. Then, in the HDMI transmission unit 216, the uncompressed video data and the audio stream are packed, and are transmitted from the HDMI terminal 217 to the audio amplifier 300 via the HDMI cable 610.

Example Configuration of the Audio Amplifier

Figure 15:
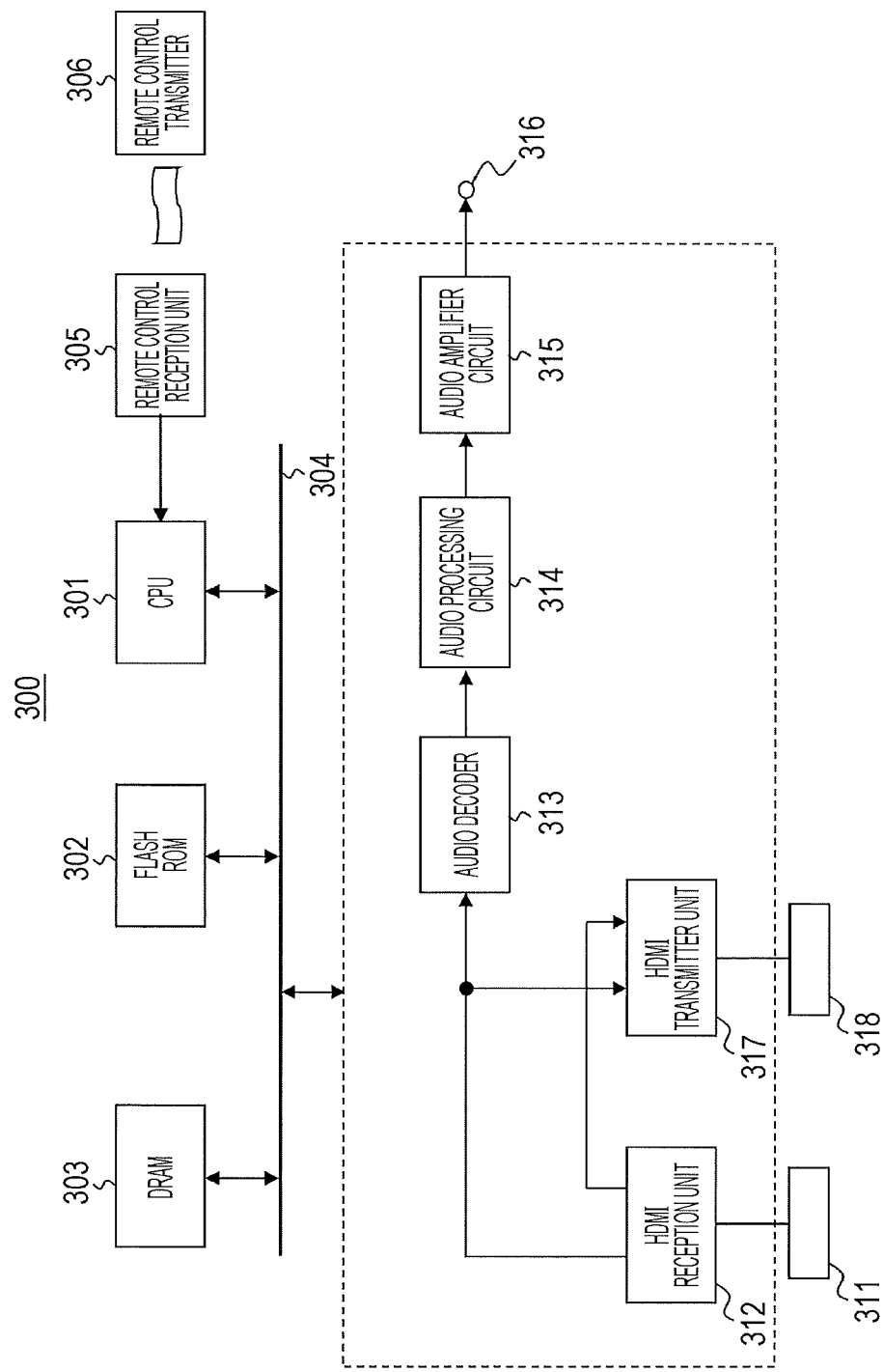
FIG. 15 is a block diagram showing an example configuration of an audio amplifier.

FIG. 15 shows an example configuration of the audio amplifier 300. The audio amplifier 300 includes a CPU 301, a flash ROM 302, a DRAM 303, an internal bus 304, a remote control reception unit 305, and a remote control transmitter 306. The audio amplifier 300 also includes an HDMI terminal 311, an HDMI reception unit 312, an audio decoder 313, an audio processing circuit 314, an audio amplifier circuit 315, an audio output terminal 316, an HDMI transmission unit 317, and an HDMI terminal 318.

The CPU 301 controls operation of each component of the audio amplifier 300. The flash ROM 302 stores control software and data. The DRAM 303 forms a work area for the CPU 301. The CPU 301 loads software and data read from the flash ROM 302 into the DRAM 303, and activates the software, to control the respective components of the audio amplifier 300.

The remote control reception unit 305 receives a remote control signal (a remote control code) transmitted from the remote control transmitter 306, and supplies the remote control signal to the CPU 301. In accordance with this remote control code, the CPU 301 controls the respective components of the audio amplifier 300. The CPU 301, the flash ROM 302, and the DRAM 303 are connected to the internal bus 304.

The HDMI reception unit 312 receives uncompressed video data and an audio stream supplied to the HDMI terminal 311 via the HDMI cable 610, by performing HDMI-compliant communication. In this audio stream, the predetermined information (the container target data) such as network access information or a media file is inserted as explained in the above description of the set-top box 200 (see FIG. 14). The HDMI reception unit 312 will be described later in detail.

The audio decoder 313 performs a decoding process on the audio stream received by the HDMI reception unit 212, to obtain uncompressed audio data (sound data) of a predetermined number of channels. The audio processing circuit 314 performs a necessary upmixing/downmixing process that is required depending on the configuration of the speaker system 400 (see FIG. 1), on the uncompressed audio data of the predetermined number of channels. By doing so, the audio processing circuit 314 obtains audio data of the necessary number of channels, and performs necessary processing such as D/A conversion.

The audio amplifier circuit 315 amplifies the audio signal of each channel obtained by the audio processing circuit 314, and outputs the amplified audio signal to the audio output terminal 316. It should be noted that the speaker system 400 is connected to the audio output terminal 316.

The HDMI transmission unit 317 transmits, from the HDMI terminal 318, the uncompressed video data and the audio stream received by the HDMI reception unit 212, by performing HDMI-compliant communication. To perform transmission through a TMDS channel compliant with HDMI, the HDMI transmission unit 317 packs the uncompressed video data and the audio stream, and then outputs the uncompressed video data and the audio stream to the HDMI terminal 318. The HDMI transmission unit 317 will be described later in detail.

Operation of the audio amplifier 200 shown in FIG. 15 is now briefly described. In the HDMI reception unit 312, uncompressed video data and an audio stream transmitted from the set-top box 200 to the HDMI terminal 311 via the HDMI cable 610 are received.

The audio stream received by the HDMI reception unit 312 is supplied to the audio decoder 313. In the audio decoder 313, a decoding process is performed on the audio stream, so that uncompressed audio data of a predetermined number of channels is obtained. This audio data is supplied to the audio processing circuit 314.

In the audio processing circuit 314, an upmixing/downmixing process that is required depending on the configuration of the speaker system 400 (see FIG. 1) is performed on the uncompressed audio data of the predetermined number of channels. As a result, audio data of the necessary number of channels is obtained, and necessary processing such as D/A conversion is performed. The audio data of the respective channels output from the audio processing circuit 314 is amplified by the audio amplifier circuit 315, and is then output to the audio output terminal 316. Thus, audio outputs of the predetermined number of channels are obtained from the speaker system 400 connected to the audio output terminal 316.

The uncompressed video data and the audio stream received by the HDMI reception unit 312 are also supplied to the HDMI transmission unit 317. It should be noted that, instead of the uncompressed video data received by the HDMI reception unit 312, video data obtained by performing processing such as graphics data superimposition on the uncompressed video data may be supplied to the HDMI transmission unit 317. In the HDMI transmission unit 317, the uncompressed video data and the audio streams are packed, and are transmitted from the HDMI terminal 318 to the television receiver 500 via the HDMI cable 620.

Example Configuration of the Television Receiver

Figure 16:
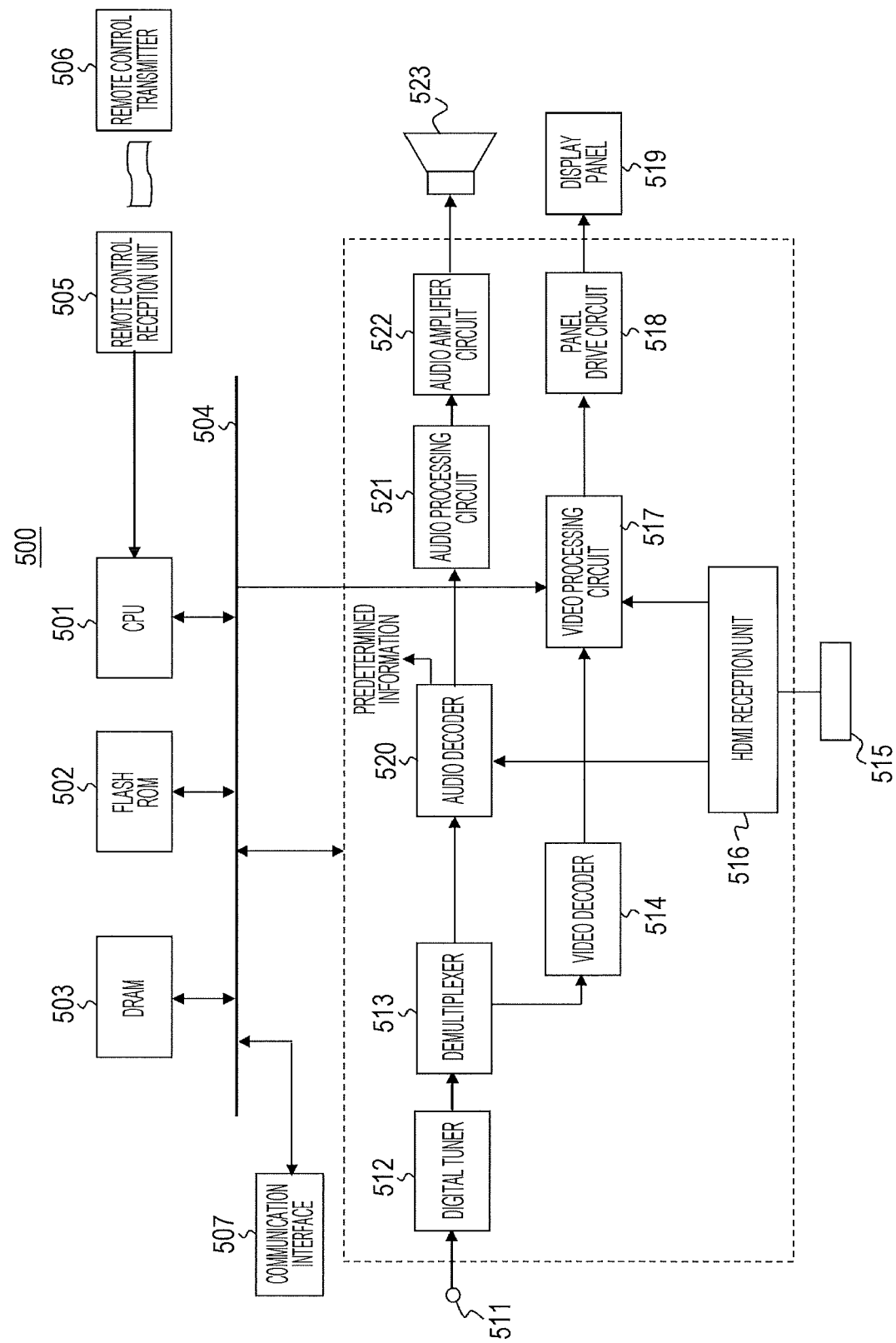
FIG. 16 is a block diagram showing an example configuration of a television receiver.

FIG. 16 shows an example configuration of the television receiver 500. The television receiver 500 includes a CPU 501, a flash ROM 502, a DRAM 503, an internal bus 504, a remote control reception unit 505, a remote control transmitter 506, and a communication interface 507.

In addition, the television receiver 500 includes an antenna terminal 511, a digital tuner 512, a demultiplexer 513, a video decoder 514, an HDMI terminal 515, and an HDMI reception unit 516. The television receiver 500 further includes a video processing circuit 517, a panel drive circuit 518, a display panel 519, an audio decoder 520, an audio processing circuit 521, an audio amplifier circuit 522, and a speaker 523.

The CPU 501 controls operations of the respective components of the television receiver 500. The flash ROM 502 stores control software and data. The DRAM 503 forms a work area for the CPU 501. The CPU 501 loads software and data read from the flash ROM 502 into the DRAM 503, and activates the software, to control the respective components of the television receiver 500.

The remote control reception unit 505 receives a remote control signal (a remote control code) transmitted from the remote control transmitter 506, and supplies the remote control signal to the CPU 501. In accordance with this remote control code, the CPU 501 controls the respective components of the television receiver 500. The CPU 501, the flash ROM 502, and the DRAM 503 are connected to the internal bus 504.

Under the control of the CPU 501, the communication interface 507 communicates with a server existing in the network such as the Internet. The communication interface 507 is connected to the internal bus 504.

The antenna terminal 511 is a terminal to which a television broadcast signal received by a reception antenna (now shown) is input. The digital tuner 512 processes the television broadcast signal input to the antenna terminal 511, and outputs the transport stream TS corresponding to the channel selected by the user.

The demultiplexer 513 extracts a video stream packet from the transport stream TS, and sends the packet to the video decoder 514. The video decoder 514 reconstructs the video stream from the video packet extracted by the demultiplexer 513, and performs a decoding process, to obtain uncompressed video data (image data).

The demultiplexer 513 also extracts an audio stream packet from the transport stream TS, and reconstructs the audio stream. In this audio stream, the predetermined information (the container target data) such as network access information or a media file is inserted as explained in the description of the stream generation unit 110 (see FIG. 2).

The HDMI reception unit 516 receives uncompressed video data and an audio stream supplied to the HDMI terminal 515 via the HDMI cable 620, by performing HDMI-compliant communication. In this audio stream, the predetermined information (the container target data) such as network access information or a media file is inserted as explained in the description of the audio amplifier 300 (see FIG. 15). The HDMI reception unit 516 will be described later in detail.

The video processing circuit 517 performs a scaling process, a combining process, and the like on the video data obtained by the video decoder 514 or the video data obtained by the HDMI reception unit 516, video data received by the communication interface 507 from a server in the network, or the like. By doing so, the video processing circuit 517 obtains display video data.

The panel drive circuit 518 drives the display panel 519 in accordance with the display image data obtained by the video processing circuit 517. The display panel 519 is formed with a liquid crystal display (LCD) or an organic electroluminescence (EL) display, for example.

The audio decoder 520 performs a decoding process on the audio stream obtained by the demultiplexer 513 or the audio stream obtained by the HDMI reception unit 516. By doing so, the audio decoder 520 obtains uncompressed audio data (sound data). The audio decoder 520 also extracts the predetermined information (the container target data) such as network access information or a media file inserted in the audio stream, and transmits the predetermined information to the CPU 501. The CPU 501 causes each component of the television receiver 500 to perform information processing using this predetermined information, as appropriate.

Here, the predetermined information is divided and inserted into a predetermined number (which may be "1") of audio frames of the audio stream, and the first information indicating whether the current piece is the first piece of the divided information and the second information as a count number indicating the dividing position in descending order are added to each piece of the divided information. In accordance with the first information and the second information, the audio decoder 520 obtains each piece of the divided information forming the predetermined information, from the predetermined number of audio frames.

In this case, the audio decoder 520 can recognize the first piece of the divided information from the first information, recognize the number of divisions from the second information corresponding to the first piece of the divided information, and further recognize the number of the remaining pieces of the divided information from the second information.

Thus, the audio decoder 520 can easily and appropriately obtain each piece of the divided information forming the predetermined information from the predetermined number of audio frames. Further, with the second information (counter information), (1) it is possible for the receiving side to detect an error in a transmission packet in the middle when such an error occurs, and (2) it is also possible for the receiving side to recognize an appropriate time required for the last packet of the divided information to reach the receiving side.

The CPU 501 causes each component of the television receiver 500 to perform information processing using this predetermined information, as appropriate. For example, when the predetermined information is network access information, the television receiver 500 accesses a predetermined server in the network, and acquires predetermined media information. Further, when the predetermined information is a media file, for example, the television receiver 500 performs a reproduction process on the media file. It should be noted that, if UTC-based time information is added to the predetermined information, time synchronization of information processing using the predetermined information is managed in accordance with the added time information.

The audio processing circuit 521 performs necessary processing such as D/A conversion on the audio data obtained by the audio decoder 520. The audio amplifier circuit 522 amplifies the sound signal output from the audio processing circuit 521, and supplies the amplified sound signal to the speaker 523.

Operation of the television receiver 500 shown in FIG. 16 is now briefly described. A television broadcast signal input to the antenna terminal 511 is supplied to the digital tuner 512. In the digital tuner 512, the television broadcast signal is processed, and the transport stream TS corresponding to the channel selected by the user is obtained.

The transport stream TS obtained by the digital tuner 512 is supplied to the demultiplexer 513. The demultiplexer 513 extracts a video stream packet from the transport stream TS, and supplies the packet to the video decoder 514. In the video decoder 514, the video stream is reconstructed from the video packet extracted by the demultiplexer 513, and a decoding process is performed, so that uncompressed video data is obtained. The uncompressed video data is supplied to the video processing circuit 517.

In the demultiplexer 513, an audio stream packet is also extracted from the transport stream TS, and the audio stream is reconstructed. This audio stream is supplied to the audio decoder 520.

In the HDMI reception unit 516, the uncompressed video data and the audio stream supplied to the HDMI terminal 515 via the HDMI cable 620 are received through HDMI-compliant communication. The uncompressed video data is supplied to the video processing circuit 517. Meanwhile, the audio stream is supplied to the audio decoder 520.

In the video processing circuit 517, a scaling process, a combining process, and the like are performed on the video data obtained by the video decoder 514 or the video data obtained by the HDMI reception unit 516, video data received by the communication interface 507 from a server in the network, or the like. As a result, display video data is obtained.

The display video data obtained by the video processing circuit 517 is supplied to the panel drive circuit 518. In accordance with the display video data, the panel drive circuit 518 drives the display panel 519. As a result, the image corresponding to the display video data is displayed on the display panel 519.

In the audio decoder 520, a decoding process is performed on the audio stream obtained by the demultiplexer 513 or the audio stream obtained by the HDMI reception unit 516, so that uncompressed audio data is obtained. The audio data obtained by the audio decoder 520 is supplied to the audio processing circuit 521. In the audio processing circuit 521, necessary processing such as D/A conversion is performed on the audio data. This audio data is amplified by the audio amplifier circuit 522, and is then supplied to the speaker 523. As a result, the sound corresponding to the image displayed on the display panel 519 is output from the speaker 523.

Also, in the audio decoder 520, the predetermined information (the container target data) such as network access information or a media file inserted in the audio stream is extracted. The predetermined information extracted by the audio decoder 520 as described above is sent to the CPU 501. Under the control of the CPU 501, information processing using the predetermined information is then performed at each component of the television receiver 500, as appropriate.

Example Configurations of an HDMI Transmission Unit and an HDMI Reception Unit

Figure 17:
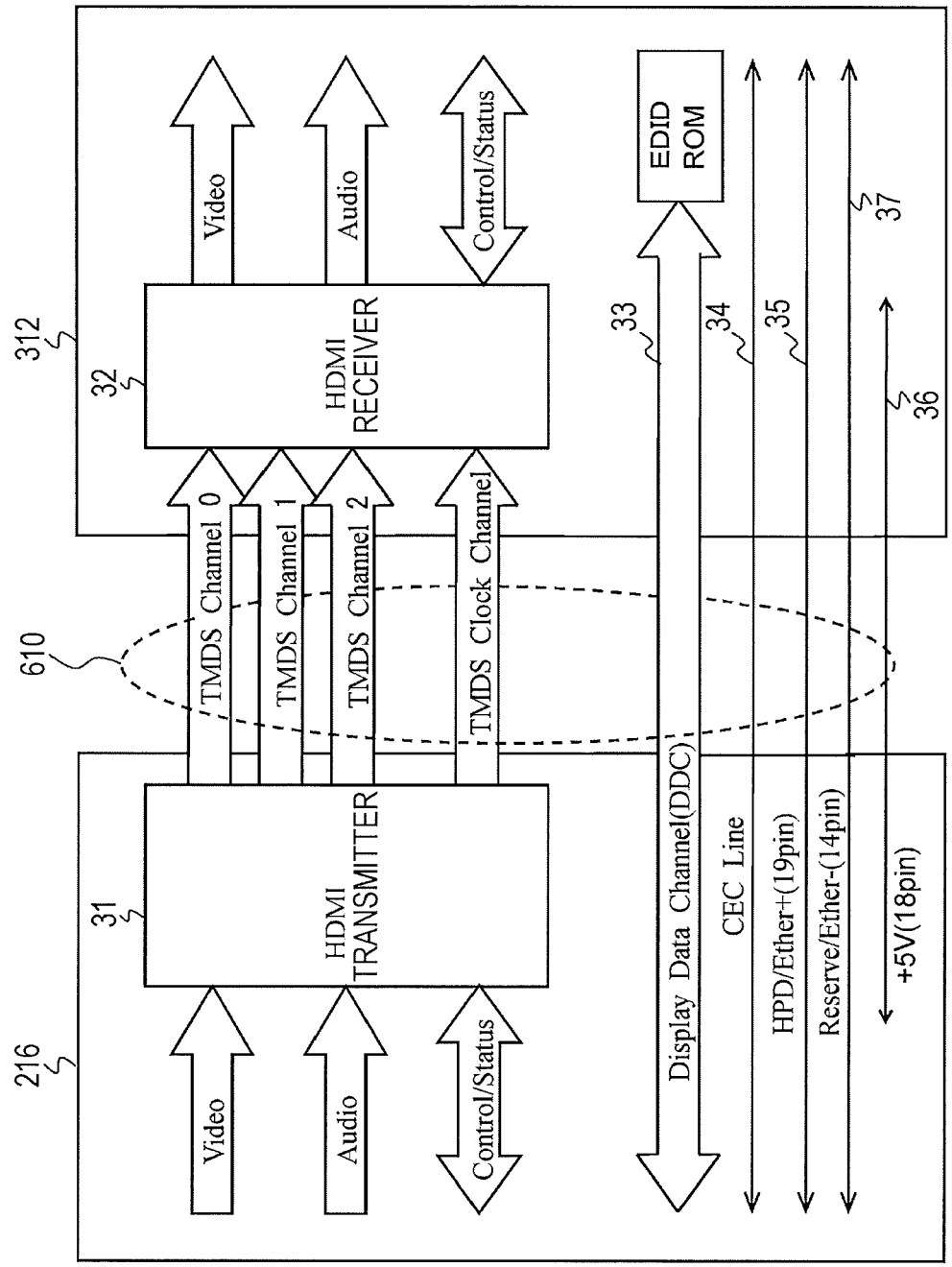
FIG. 17 is a block diagram showing an example configuration of an HDMI transmission unit and an HDMI reception unit.

FIG. 17 shows example configurations of the HDMI transmission unit 216 (see FIG. 14) of the set-top box 200 and the HDMI reception unit 312 (see FIG. 15) of the audio amplifier 300 in the transmission/reception system 10 shown in FIG. 1. It should be noted that example configurations of the HDMI transmission unit 317 of the audio amplifier 300 and the HDMI reception unit 516 of the television receiver 500 are similar to those of the HDMI transmission unit 216 and the HDMI reception unit 312, and therefore, explanation thereof will not be made below.

The HDMI transmission unit 216 unidirectionally transmits the differential signal corresponding to the pixel data of an uncompressed image of one screen to the HDMI reception unit 312 through channels in an active image period 21 (hereinafter also referred to as the "active video period", where appropriate) (see FIG. 18) that is a period obtained by subtracting a horizontal blanking period 22 and a vertical blanking period 23 from the period from one vertical synchronization signal to the next vertical synchronization signal. In the horizontal blanking period 22 or the vertical blanking period 23, the HDMI transmission unit 216 also unidirectionally transmits the differential signals corresponding to at least sound data accompanying the image, control data, other auxiliary data, and the like, to the HDMI reception unit 312 through the channels.

That is, the HDMI transmission unit 216 includes an HDMI transmitter 31. For example, the transmitter 31 converts the pixel data of an uncompressed image into the corresponding differential signal, and unidirectionally and serially transmits the differential signal to the HDMI reception unit 312 through three transition minimized differential signaling (TMDS) channels #0, #1, and #2, which are the channels.

The transmitter 31 also converts the sound data accompanying the uncompressed image, as well as the necessary control data, the other auxiliary data, and the like, into the corresponding differential signals, and unidirectionally and serially transmits the differential signals to the HDMI reception unit 312 through the three TMDS channels #0, #1, and #2.

In the active video period 21 (see FIG. 18), the HDMI reception unit 312 receives the differential signal corresponding to the pixel data transmitted unidirectionally from the HDMI transmission unit 216 through the channels. In the horizontal blanking period 22 (see FIG. 18) or the vertical blanking period 23 (see FIG. 18), the HDMI reception unit 312 also receives the differential signals corresponding to the sound data and the control data transmitted unidirectionally from the HDMI transmission unit 216 through the channels.

The transmission channels in the HDMI system formed with the HDMI transmission unit 216 and the HDMI reception unit 312 include transmission channels such as a display data channel (DDC) 33 and a consumer electronics control (CEC) line 34, as well as the three TMDS channels #0 through #2 serving as the transmission channels for transmitting pixel data and sound data, and a TMDS clock channel serving as the transmission channel for transmitting a pixel clock.

The DDC 33 is formed with two signal lines included in the HDMI cable 610, and is used by the HDMI transmission unit 216 to read extended display identification data (EDID) from the HDMI reception unit 312 connected thereto via the HDMI cable 610. That is, the HDMI reception unit 312 includes not only the HDMI receiver 32 but also an EDID read only memory (ROM) storing the EDID, which is performance information about the performance (configuration and capability) thereof. As the HDMI transmission unit 216 reads the EDID, the decoding capability information about the receiving side is sent to the transmitting side.

The HDMI transmission unit 216 reads the EDID, via the DDC 33, from the HDMI reception unit 312 connected thereto via the HDMI cable 610. From the EDID, the CPU 201 of the set-top box 200 recognizes the performance of the audio amplifier 300 including the HDMI reception unit 312.

The CEC line 34 is formed with one signal line included in the HDMI cable 610, and is used for performing bidirectional communications of control data between the HDMI transmission unit 216 and the HDMI reception unit 312. The HDMI cable 610 also includes an HPD line 35 connected to a pin called Hot Plug Detect (HPD).

Using the HPD line 35, the source device can detect the connection of a sink device (a destination device) from a DC bias potential. In this case, from the viewpoint of the source device, the HPD line 35 has a function to receive a notification of a connection status from the sink device through a DC bias potential. From the viewpoint of the sink device side, on the other hand, the HPD line has a function to notify the source device of a connection status through a DC bias potential. The HDMI cable 610 also includes a power supply line 36 that is used for supplying power from the source device to the sink device.

The HDMI cable 610 further includes a reserve line 37. There is an HDMI Ethernet channel (HEC) that transmits an Ethernet signal, using the HPD line 35 and the reserve line 37. There also is an audio return channel (ARC) that transmits audio data from the destination device (the sink device) to the source device, using both the HPD line 35 and the reserve line 37, or using only the HPD line 35. It should be noted that "Ethernet" is a registered trademark.

Figure 18:
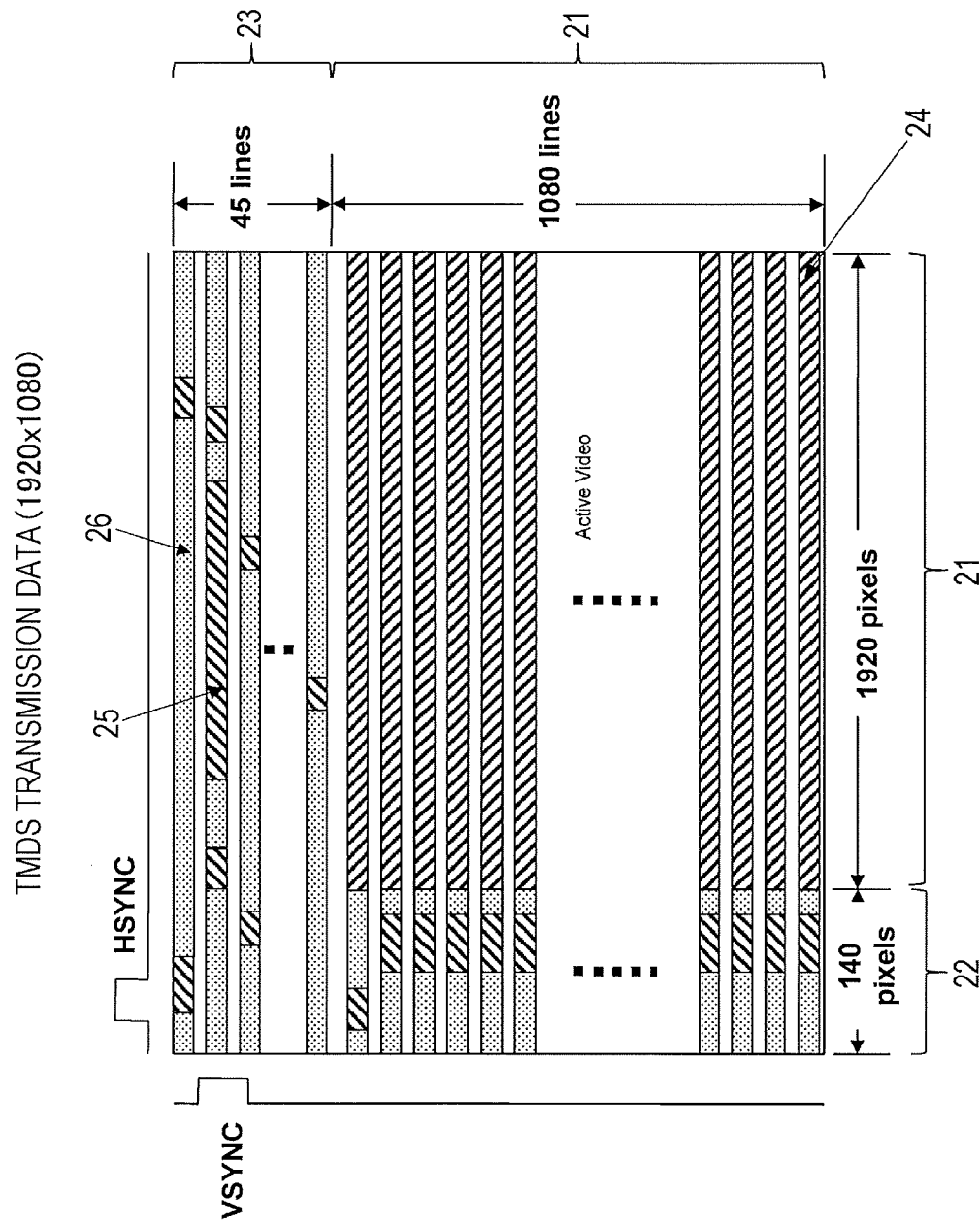
FIG. 18 is a diagram showing periods for various kinds of transmission data in a case where image data is transmitted through TMDS channels.

FIG. 18 shows periods of various kinds of transmission data in a case where image data of 1920 pixels×1080 lines is transmitted through TMDS channels. In a video field (Video Field) in which transmission data is transmitted through three TMDS channels compliant with HDMI, there are the three kinds of periods: video data periods 24 (Video Data Periods), data island periods 25 (Data Island Periods), and control periods 26 (Control Periods).

Here, a video field period is a period from the rising edge (Active Edge) of a vertical synchronization signal to the rising edge of the next vertical synchronization signal, and is divided into the horizontal blanking period 22 (Horizontal Blanking), the vertical blanking period 23 (Vertical Blanking), and the active pixel period 21 (Active Video) that is the period obtained by subtracting the horizontal blanking period and the vertical blanking period from the video field period.

The video data periods 24 are assigned to the active pixel period 21. In the video data periods 24, data of active pixels (Active Pixels) equivalent to 1920 pixels×1080 lines, which constitute uncompressed image data of one screen, is transmitted. Meanwhile, the data island periods 25 and the control periods 26 are assigned to the horizontal blanking period 22 and the vertical blanking period 23. In the data island periods 25 and the control periods 26, auxiliary data (Auxiliary Data) is transmitted.

Specifically, the data island periods 25 are assigned to some portions of the horizontal blanking period 22 and the vertical blanking period 23. In the data island periods 25, data unrelated to control in the auxiliary data, such as sound data packets, is transmitted. The control periods 26 are assigned to the remaining portions of the horizontal blanking period 22 and the vertical blanking period 23. In the control periods 26, data related to control in the auxiliary data, such as vertical synchronization signals, horizontal synchronization signals, and control packets, is transmitted.

As described above, in the transmission/reception system 10 shown in FIG. 1, the broadcast transmission device 100 divides and inserts predetermined information (container target data) into audio frames of an audio stream, and adds, to each of the divided information, the first information indicating whether the current piece is the first piece of the divided information, and the second information that is a count number indicating the dividing position in descending order. Accordingly, it is possible for the receiving side to recognize the first piece of the divided information from the first information, recognize the number of divisions from the second information corresponding to the first piece of the divided information, and further recognize the number of the remaining pieces of the divided information from the second information. Thus, the predetermined information can be readily and appropriately obtained.

Also, in the transmission/reception system 10 shown in FIG. 1, the broadcast transmission device 100 adds UTC-based time information (general time information) as time information for managing time synchronization, to the predetermined information (the container target data) inserted in the audio stream. Thus, affinity with a general-purpose system can be achieved.

2. Modifications

In the above embodiment, an example where the audio compression format is MPEG-H 3D Audio has been described.

However, the present technology can also be applied in cases where the audio compression format is some other audio compression format, such as AAC, AC3, or AC4.

Also, in the above embodiment, the set-top box 200 is designed to receive a video stream and an audio stream from a broadcast signal transmitted from the broadcast transmission device 100. However, the set-top box 200 may also receive a video stream and an audio stream from a distribution server (a streaming server) via a network.

Also, in the above embodiment, an example where the container is a transport stream (MPEG-2 TS) has been described. However, the present technology can also be applied to a system that performs distribution with an MP4 or a container other than that. For example, the present technology can be applied to an MPEG-DASH-based stream distribution system, or a transmission/reception system that handles an MPEG media transport (MMT) structure transmission stream.

Figure 19:
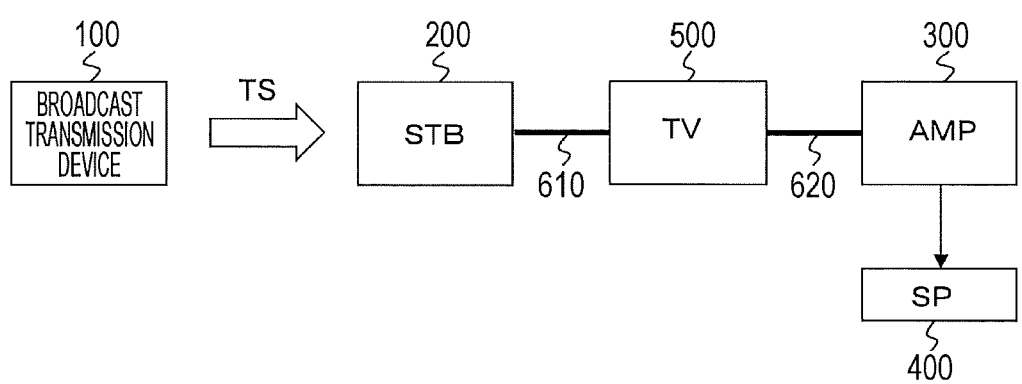
FIG. 19 is a block diagram showing another example configuration of a transmission/reception system.

Also, in the above embodiment, an example where the audio amplifier 300 is interposed between the set-top box 200 and the television receiver 500 has been described. However, it is also possible to form a transmission/reception system 10A in which the set-top box 200 is connected directly to the television receiver 500, as shown in FIG. 19.

In this transmission/reception system 10A, the set-top box 200 and the television receiver 500 are connected to each other via the HDMI cable 610. In this case, the set-top box 200 is the source, and the television receiver 500 is the destination. The audio amplifier 300 and the television receiver 500 are connected to each other via the HDMI cable 620. In this case, the audio amplifier 300 is the source, and the television receiver 500 is the destination.

In this case, uncompressed video data and an audio stream in which the predetermined information (the container target data) such as network access information or a media file is inserted are transmitted from the set-top box 200 to the television receiver 500 through an HDMI digital interface. The audio stream or decoded audio data is also transmitted from the television receiver 500 to the audio amplifier 300 through an HDMI audio return channel.

Also, in the above embodiment, the transmission/reception system 10 including the set-top box 200 and the television receiver 500 has been described. However, instead of the television receiver 500, a monitor device, a projector, or the like may be employed. Also, instead of the set-top box 200, a recorder with a receiving function, a personal computer, or the like may be employed.

Further, in the above embodiment, the respective devices on the receiving side are connected by wires through an HDMI digital interface. However, it is of course possible to apply the present invention in cases where the respective devices are connected by wires through a digital interface similar to a digital interface compliant with HDMI, or may be even wirelessly connected.

The present technology may also be embodied in the configurations described below.

(1) A transmission device including:

a stream generation unit that performs an encoding process on audio data, and generates a compressed audio data stream formed with successive audio frames including compressed audio data;

an information insertion unit that inserts predetermined information into the compressed audio data stream; and a stream transmission unit that transmits the compressed audio data stream in which the predetermined information is inserted, in which the information insertion unit divides and inserts the predetermined information into a predetermined number of audio frames of the compressed audio data stream, and adds first information and second information to each piece of the divided predetermined information, the first information indicating whether a current piece is the first piece of the divided predetermined information, the second information being a count number indicating a dividing position in descending order.

(2) The transmission device of (1), in which, when inserting the predetermined information into the compressed audio data stream, the information insertion unit adds UTC-based time information for managing time synchronization to the predetermined information.

(3) The transmission device of (2), in which the time information is an absolute time or the value of a difference from a predetermined reference time.

(4) The transmission device of any of (1) to (3), in which the predetermined information is network access information or a media file.

(5) A transmission method including:
a stream generation step of performing an encoding process on audio data and generating a compressed audio data stream formed with successive audio frames including compressed audio data;
an information insertion step of inserting predetermined information into the compressed audio data stream; and
a stream transmission step of transmitting the compressed audio data stream in which the predetermined information is inserted, the compressed audio data stream being transmitted by a transmission unit,
in which the information insertion step includes dividing the predetermined information into a predetermined number and inserting the predetermined information into the predetermined number of audio frames of the compressed audio data stream, and adding first information and second information to each piece of the divided predetermined information, the first information indicating whether a current piece is the first piece of the divided predetermined information, the second information being a count number indicating a dividing position in descending order.

(6) A reception device including:
a stream reception unit that receives a compressed audio data stream from an external device via a digital interface, predetermined information being inserted in the compressed audio data stream,
respective pieces of divided information obtained by dividing the predetermined information being inserted in a predetermined number of audio frames of the compressed audio data stream, first information and second information being added to each piece of the divided information, the first information indicating whether a current piece is the first piece of the divided information, the second information being a count number indicating a dividing position in descending order;
a decoding processing unit that obtains audio data by performing a decoding process on the compressed audio data stream, and, in accordance with the first information and the second information, obtains the respective pieces of the divided information forming the predetermined information from the predetermined number of audio frames; and
an information processing unit that performs information processing using the predetermined information obtained by the decoding processing unit.

(7) The reception device of (6), in which
the predetermined information is network access information, and
the information processing unit obtains predetermined media information by accessing a predetermined server in a network, using the network access information.

(8) The reception device of (6), in which
the predetermined information is a media file, and
the information processing unit performs a reproduction process on the media file.

(9) The reception device of any of (6) to (8), in which
UTC-based time information for managing time synchronization is added to the predetermined information, and
the information processing unit performs time management on the information processing using the predetermined information, in accordance with the UTC-based time information added to the predetermined information.

(10) A reception method including:
a stream reception step of receiving a compressed audio data stream from an external device via a digital interface, predetermined information being inserted in the compressed audio data stream, the compressed audio data stream being received by a reception unit,
respective pieces of divided information obtained by dividing the predetermined information being inserted in a predetermined number of audio frames of the compressed audio data stream, first information and second information being added to each piece of the divided information, the first information indicating whether a current piece is the first piece of the divided information, the second information being a count number indicating a dividing position in descending order;
a decoding processing step of obtaining audio data by performing a decoding process on the compressed audio data stream, and, in accordance with the first information and the second information, obtaining the respective pieces of the divided information forming the predetermined information from the predetermined number of audio frames; and
an information processing step of performing information processing using the predetermined information obtained in the decoding processing step.

A principal feature of the present technology is that, when predetermined information (container target data) is divided and inserted into audio frames of an audio stream, first information "start_flag" indicating whether the current piece is the first piece of the divided information, and second information "dcounter" as a count number indicating the dividing position in descending order are added to each piece of the divided information. In this manner, the predetermined information can be readily and appropriately obtained on the receiving side (see FIG. 5).

REFERENCE SIGNS LIST 10, 10A Transmission/reception system
21 Active pixel period
22 Horizontal blanking period
23 Vertical blanking period
24 Video data period
25 Data island period
26 Control period
31 HDMI transmitter
32 HDMI receiver
33 DDC
34 CEC line
35 HPD line
26 Power supply line
37 Reserve line
100 Broadcast transmission device
110 Stream generation unit
111 Control unit
111a CPU
112 Video encoder
113 Audio encoder
113a Audio encoding block unit 113b Audio framing unit
114 Multiplexer
200 Set-top box (STB)
201 CPU
202 Flash ROM
203 DRAM
204 Internal bus
205 Remote control reception unit
206 Remote control transmitter
211 Antenna terminal
212 Digital tuner
213 Demultiplexer
214 Video decoder
215 Audio framing unit
216 HDMI transmission unit
217 HDMI terminal
300 Audio amplifier (AMP)
301 CPU
302 Flash ROM
303 DRAM
304 Internal bus
305 Remote control reception unit
306 Remote control transmitter
311 HDMI terminal
312 HDMI reception unit
313 Audio decoder
314 Audio processing circuit
315 Audio amplifier circuit
316 Audio output terminal
400 Speaker system (SP)
500 Television receiver (TV)
501 CPU
502 Flash ROM
503 DRAM
504 Internal bus
505 Remote control reception unit
506 Remote control transmitter
507 Communication interface
511 Antenna terminal
512 Digital tuner
513 Demultiplexer
514 Video decoder
515 HDMI terminal
516 HDMI reception unit
517 Video processing circuit
518 Panel drive circuit
519 Display panel
520 Audio decoder
521 Audio processing circuit
522 Audio amplifier circuit
523 Speaker
610, 620 HDMI cable

The invention claimed is:

1. A transmission device, comprising:
processing circuitry configured to
perform an encoding process on audio data to generate a compressed audio data stream formed with successive audio frames including compressed audio data, each audio frame including plural audio stream packets;
divide information associated with a media file or network access information into a plurality of groups, each of the plurality of groups including a plurality of pieces;
insert the divided information into the audio frames such that each piece of the plurality of pieces of the divided information is allocated to a corresponding payload of an audio stream packet of the plural audio stream packets;
add first information, second information, and third information into each piece of the plurality of pieces of the divided information; and
transmit the compressed audio data stream including the divided information, wherein
the first information indicates whether a current piece in one of the plurality of groups is a first piece of the one of the plurality of groups,
the second information is a count number indicating a number of remaining pieces of the divided information in the one of the plurality of groups in a descending order, and
the third information indicating a reference time corresponding to the respective piece of the plurality of pieces of the divided information.

2. The transmission device according to claim 1, wherein the third information is coordinated universal time (UTC)-based time information for managing time synchronization to the divided information.

3. The transmission device according to claim 2, wherein the time information is one of an absolute time and a value of a difference from a reference time.

4. The transmission device of claim 1, wherein the first information is a flag that indicates whether the current piece in the one of the plurality of groups is the first piece of the one of the plurality of groups.

5. The transmission device of claim 1, wherein each of the plurality of groups has a group ID.

6. The transmission device of claim 1, wherein the first information and the second information are included in a header of the audio stream packet.

7. The transmission device of claim 1, wherein, when the second information is 0, the second information indicates that the current piece is a last piece of the divided information in the one of the plurality of groups or that the one of the plurality of groups contains only one piece of the divided information.

8. A transmission method, comprising:
performing an encoding process on audio data and generating a compressed audio data stream formed with successive audio frames including compressed audio data, each audio frame including plural audio stream packets;
dividing information associated with a media file or network access information into a plurality of groups, each of the plurality of groups including a plurality of pieces;
inserting the divided information into the audio frames such that each piece of the plurality of pieces of the divided information is allocated to a corresponding payload of an audio stream packet of the plural audio stream packets;
adding first information, second information, and third information into each piece of the plurality of pieces of the divided information; and
transmitting, using a transmitter, the compressed audio data stream including the divided information, wherein
the first information indicates whether a current piece in one of the plurality of groups is a first piece of the one of the plurality of groups,
the second information is a count number indicating a number of remaining pieces of the divided information in one of the plurality of groups in a descending order, and the third information indicating a reference time corresponding to the respective piece of the plurality of pieces of the divided information.

9. A reception device, comprising:
processing circuitry configured to
receive a compressed audio data stream from an external device via a digital interface, information associated with a media file or network access information being divided into a plurality of groups, each of the plurality of groups including a plurality of pieces, the plurality of pieces of the divided information being inserted into audio frames of the compressed audio data stream, each audio frame including plural audio stream packets, such that each piece of the plurality of pieces of the divided information is allocated to a corresponding payload of an audio stream packet of the plural audio stream packets, first information, second information, and third information being added to each piece of the plurality of pieces of the divided information, the first information indicating whether a current piece in one of the plurality of groups is a first piece of the one of the plurality of groups, the second information being a count number indicating a number of remaining pieces of the divided information in the one of the plurality of groups in a descending order, and the third information indicating a reference time corresponding to the respective piece of the plurality of pieces of the divided information;
obtain audio data by performing a decoding process on the compressed audio data stream, and, in accordance with the first information, the second information, and the third information obtain the plurality of pieces of the divided information forming the information from the audio frames; and
perform information processing using the formed information.

10. The reception device according to claim 9, wherein the information is the network access information, and the processing circuitry is configured to obtain media information by accessing a server in a network, using the network access information.

11. The reception device according to claim 9, wherein the information is the media file, and
the processing circuitry is further configured to perform a reproduction process on the media file.

12. The reception device according to claim 9, wherein the third information is coordinated universal time (UTC)-based time information for managing time synchronization, and
the processing circuitry is configured to perform time management in accordance with the UTC-based time information added to the information.

13. A reception method, comprising:
receiving a compressed audio data stream from an external device via a digital interface, information associated with a media file or network access information being divided into a plurality of groups, each of the plurality of groups including a plurality of pieces, the plurality of pieces of the divided information being inserted into audio frames of the compressed audio data stream, each audio frame including plural audio stream packets, such that each piece of the plurality of pieces of the divided information is allocated to a corresponding payload of an audio stream packet of the plural audio stream packets, first information, second information, and third information being added to each piece of the plurality of pieces of the divided information, the first information indicating whether a current piece in one of the plurality of groups is a first piece of the one of the plurality of groups, the second information being a count number indicating a number of remaining pieces of the divided information in the one of the plurality of groups in a descending order, and the third information indicating a reference time corresponding to the respective piece of the plurality of pieces of the divided information;
obtaining audio data by performing a decoding process on the compressed audio data stream, and, in accordance with the first information, the second information, and the third information, obtaining the plurality of pieces of the divided information forming the information from the audio frames; and
performing information processing using the formed information.

* * * * *